US007818409B2

(12) United States Patent
Chandrashekhar et al.

(10) Patent No.: US 7,818,409 B2
(45) Date of Patent: Oct. 19, 2010

(54) DYNAMIC VIRTUAL PRIVATE NETWORK SYSTEM AND METHODS

(75) Inventors: Uma Chandrashekhar, Morganville, NJ (US); Mohamed L. El-Sayed, Red Bank, NJ (US); Kenneth J. Johnson, Holmdel, NJ (US); Andrew R. McGee, Toms River, NJ (US); Steven H. Richman, Marlboro, NJ (US); S. Rao Vasireddy, Holmdel, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 2061 days.

(21) Appl. No.: 10/053,801

(22) Filed: Jan. 22, 2002

(65) Prior Publication Data

US 2003/0140131 A1    Jul. 24, 2003

(51) Int. Cl.
*G06F 15/173* (2006.01)

(52) U.S. Cl. .................. 709/223; 709/224; 709/225; 370/230; 370/235

(58) Field of Classification Search ......... 709/223–225; 370/230, 235
See application file for complete search history.

(56) References Cited

U.S. PATENT DOCUMENTS

| 6,778,529 | B1 * | 8/2004 | Field et al. ................. 370/353 |
| 6,856,676 | B1 * | 2/2005 | Pirot et al. .............. 379/201.01 |
| 6,912,232 | B1 * | 6/2005 | Duffield et al. ............. 370/468 |
| 2002/0069278 | A1 * | 6/2002 | Forslow ..................... 709/225 |
| 2002/0095498 | A1 * | 7/2002 | Chanda et al. .............. 709/225 |
| 2002/0099669 | A1 * | 7/2002 | Lauer .......................... 705/80 |
| 2002/0169858 | A1 * | 11/2002 | Bellinger et al. ............ 709/220 |
| 2003/0037040 | A1 * | 2/2003 | Beadles et al. ................ 707/1 |
| 2005/0088977 | A1 * | 4/2005 | Roch et al. ................. 370/254 |

* cited by examiner

*Primary Examiner*—Duyen M Doan
(74) *Attorney, Agent, or Firm*—Wall & Tong, LLP

(57) ABSTRACT

A system and method for dynamically managing Virtual Private Networks (VPNs) in a manner enabling subscriber access to VPN services on an as needed basis.

25 Claims, 17 Drawing Sheets

100

600

800

APPLICATION MANAGES D-VPN

DYNAMIC VIRTUAL PRIVATE NETWORK SYSTEM AND METHODS

TECHNICAL FIELD

The invention relates to the field of communications systems and, more particularly, the invention relates to a system and method for dynamic management of Internet Protocol (IP) Virtual Private Networks.

BACKGROUND OF THE INVENTION

Internet Protocol (IP) Virtual Private Networks (VPNs) are overlaid on top of public IP networks to provide connectivity between geographically disperse locations in lieu of connections owned or leased exclusively for a private network. They allow businesses to connect branch offices, telecommuters, field representatives, and partners/suppliers to a central location using the Internet or an Internet Service Provider's (ISP's) public, shared IP network to securely transmit private data. IP VPNs can also consist of specifically defined groups of end-users who use the Internet or an ISP's public, shared IP network to securely transmit private data. The most common forms of IP VPNs are intranet VPNs, remote access VPNs (or dial VPNs), and Extranet VPNs. IP VPNs have all the characteristics of a private network even though they use a shared public infrastructure, and are offered by ISPs to business customers who want to leverage the efficiencies of a public network, but desire the security of a private network. IP VPNs aim to provide the reliability, performance, quality of service, and security of traditional WAN environments using less costly and more flexible ISP facilities.

The IP VPN solutions available today are cost effective because they are implemented on a shared network infrastructure. IP VPNs eliminate expensive leased line connections and long-distance dial-ups, reduce administrative overhead, and provide the flexibility needed to meet ever-changing network requirements. Extranet VPNs offer very definite cost and security benefits over alternatives.

Today's Internet Service Provider (ISP) network architecture supports access to the Internet for dedicated, remote, and mobile access users and provides the foundation for current IP VPN service offerings. In a typical ISP network architecture, such as depicted in FIG. 1, dedicated access customers (36) use an access router (35) to connect to the ISP's network (10) by means of low-speed access networks (30), for example, private line T-1, frame relay, xDSL and the like. Remote users (37) connect to the ISP by means of the PSTN and mobile users (38) connect to the ISP by means of a wireless network, both of which are low-speed access networks. Edge routers (25) provide access to the ISP's core network. The ISP connects to the Internet (20), or other ISPs, by means of peering routers (15). Servers (40-60) sitting in the ISPs Network Operations Center (NOC) or Data Center provide authentication, authorization, and accounting functions. Servers providing additional IP services such as DHCP address assignment, DNS name resolution, web hosting and the like also reside in the ISP's Data Center.

Traditionally, IP VPNs are statically provisioned by a ISP's Network Operations Center (NOC) personnel at which time customers specify the IP VPN's topology, user membership, and security levels. Creating or deleting an IP VPN, or changing its topology, or security parameters, requires a call by the subscriber to their ISP whose personnel perform the IP VPN management. This process incurs a provisioning delay and impacts potential revenue that could be generated by the ISP.

New generations of advanced IP applications are emerging that require the specific levels of QoS, access restrictions, data integrity, and group confidentiality that an IP VPN service can offer. These applications may be used for limited, pre-determined times by large and dynamic bases of subscribers. However, the concept of a limited-time IP VPN service, as well as an IP VPN service automatically being made available at a certain time, cannot be implemented using current networking technologies. Therefore, ISP network resources dedicated to the IP VPN service sit idle when the IP VPN is not in use.

SUMMARY OF THE INVENTION

The invention comprises a system and method for dynamically managing IP Virtual Private Networks (VPNs) in a manner enabling subscriber access to IP VPN services on an as-needed basis.

Apparatus according to one embodiment of the invention comprises: a plurality of internet protocol (IP) services aggregation switches for communicating between respective access networks and a core network, each of the IP services aggregation switches communicating with at least one respective user; and a dynamic virtual private network (VPN) manager, for providing customer network management and policy server functions including a user interface enabling remote management of a VPN by a user; wherein the VPN having a defined quality of service (QoS) parameter and a defined security parameter with associated billing rates, at least one of the QoS parameter and the security parameter being adapted in response to user commands provided to the dynamic VPN manager.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 2:
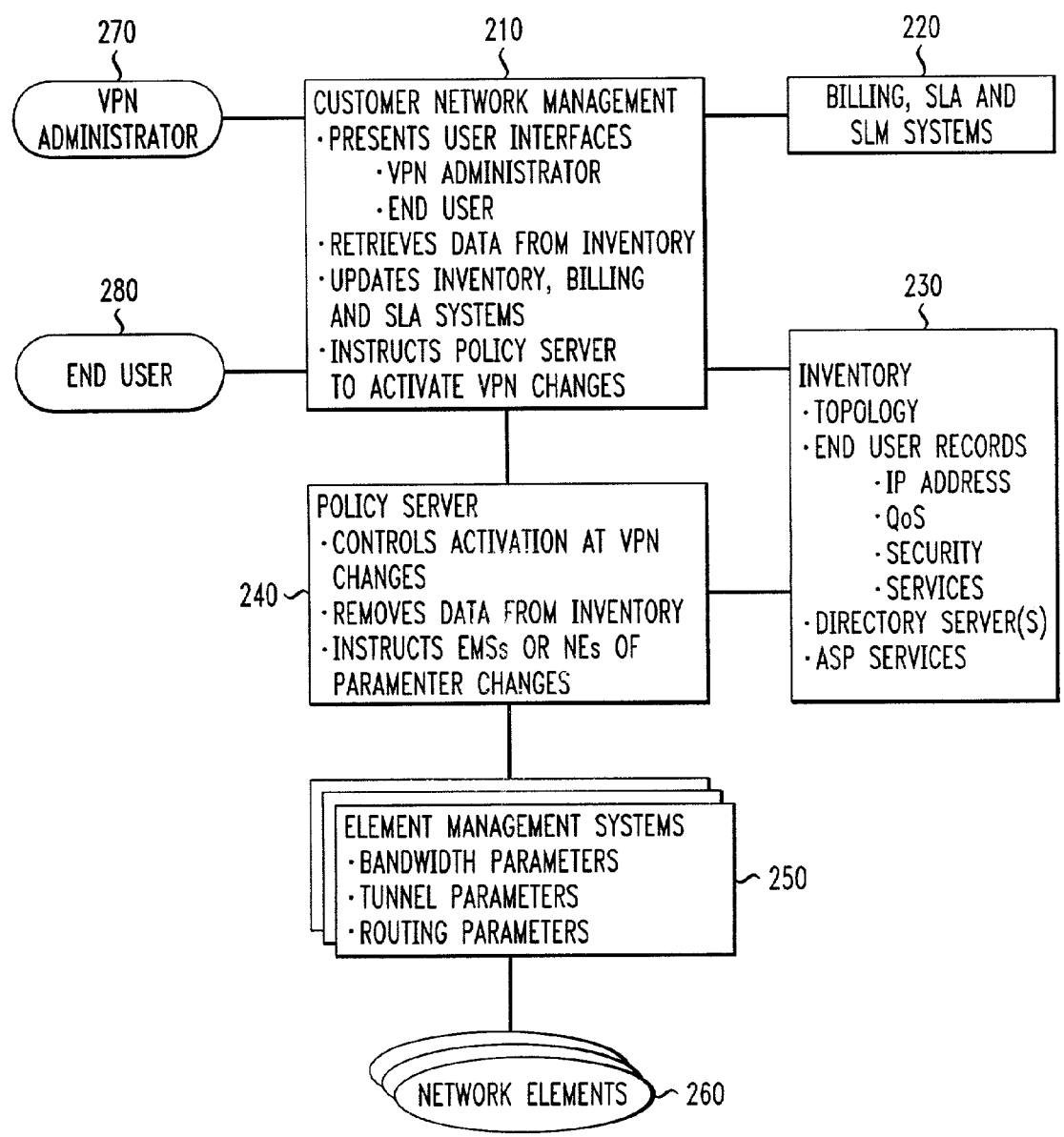
FIG. 2 depicts a functional architecture of network management systems that enable Dynamic IP Virtual Private Network (D-VPN) based services.

FIG. 2 depicts a functional architecture of network management systems that enable D-VPN based services. Specifically, the functional architecture 200 contemplates a customer network management (CNM) function 210, a billing, service level agreement (SLA) and service level management (SLM) function 220, an inventory function 230, a policy server function 240, one or more element management systems 250, and one or more groups of network elements 260, where each group of network elements 260 has associated with it a respective element management system 250. A virtual private network (VPN) administrator 270 interacts with the CNM 210 to manage various IP VPN services. An end user 280 interacts with the CNM 210 to access the various IP VPN services enabled by the VPN administrator 270. For example, in an embodiment of the invention that will be described in more detail below with respect to FIG. 6, a VPN administrator 270 has generated a plurality of IP VPN services, each of which provides a different interactive gaming experience. A user 280 selects a desired IP VPN service to join or access, and is subsequently billed based upon, for example, the quality of service (QoS) level required to implement the selected service. The various Operations Support Systems (OSS) discussed with respect to the functional architecture 200 of FIG. 2 may be deployed within, for example, the Network Operations Center (NOC) of an ISP.

The VPN administrator may also delegate a subset of his/her roles and responsibilities to other personnel. The actions that can be performed by these delegates are controlled by Role-Based Access Control (RBAC) technology. The delegated roles/responsibilities can include activities (such as creation, modification, deletion) of Dynamic IP VPNs or D-VPN administrative authority over a portion of the IP network (for example, a departmental IP VPN). The VPN administrator and/or the delegates may be employees of the ISP (e.g., ISP NOC personnel) or employees of ISP customers (e.g., an enterprise network administrator).

The Customer Network Management (CNM) system 210 is a service-level OSS. The CNM 210 presents a browser-based interface to the business customer's VPN Administrator, or ISP network management personnel, which is used to manage the business customer's IP VPN services. Management of IP VPN services includes creating, changing, and deleting IP VPN services and parameters, the management of QoS classes, profiles, security options, ASP services, as well as billing and SLA verification. The CNM system also interfaces to the ISP's Service Level Management (SLM) system, where it is used by the ISP's internal network managers to monitor the metrics associated with IP VPN services.

The CNM 210 presents a browser-based interface to the business customer's end-users. Examples of options presented to end-users include the ability to increase access bandwidth based on service or application needs, change QoS parameters (e.g., delay, guaranteed bit rate and the like), and select an ASP service (e.g., subscribe to an on-line course).

The CNM 210 retrieves data from the Inventory System 230. This data comprises topology (access bandwidth), customer information (security levels, QoS parameters, service subscriptions and the like), along with routing and tunneling parameters. The CNM 210 updates data in the Inventory System when the VPN Administrator 270 adds and deletes users, changes QoS parameters, adds an ASP service and performs other such functions. The CNM 210 also updates the Inventory System 230 when an authorized end-user modifies one or more IP VPN parameters.

The CNM 210 sends a message to the billing system 220 when necessary to support usage-based billing. For example, the billing system is informed if an end-user accessed an ASP-provided service. The CNM also sends a message to the SLA and SLM managers, if applicable. For example, if the customer's SLA contract includes one or more parameters that can be changed dynamically, then the SLA manager may need to be notified.

Once a D-VPN transaction is authorized, the CNM 210 sends a message to the Policy Server 240, which controls the implementation of the information from the Inventory System 230, e.g., routing and tunneling parameters. Then the Policy Server 240 sends messages to the Element Management Systems (EMSs) 250, which have direct interfaces to the network elements 260. For example, an end-user request to increase access bandwidth might require that an EMS 250 send a message to a network element 260 to change a configurable parameter.

The Dynamic IP VPN technology of the invention advantageously employs IP VPNs with Directory Enabled Networking and web-based Subscriber Service Selection. The invention places IP VPN management into the hands of the user and Network Operations personnel to enable rapid service selection results, lowering ISP operations costs, and subsequently reducing the cost to the end-user. Also described are a target architecture and framework as well as several types of services that are supported by D-VPN technology. The Dynamic IP VPN technology leverages advances in IP Service Switches, Integrated Access Devices (IADs), and the underlying service and network management techniques to enable subscriber self-provisioning of IP VPN services and to allow the application of temporal parameters to these services. The D-VPN technology also enables applications to perform IP VPN management operations, without user intervention, by means of, for example, a set of Application Programming Interfaces (APIs).

The disclosed D-VPN technology utilizes IP bandwidth management, IP VPNs, and Directory Enabled Networking to provide an integrated platform from which subscriber self-provisioning is possible. It may be implemented as a distributed technology, with components in a subscriber's CPE and in the ISP's core network and data centers. Working in concert, these components provide secure, manageable, bi-directional IP QoS, potentially with different classes of service, over any IP VPN topology, in addition to the key subscriber self-provisioning capability to modify these services on demand.

A single user interface may be used to manage the above-described example, an ISP's NOC or Data Center and is accessible to remote customers by means of a web interface. A remote user, at a customer location, is able to access this interface and use it to dynamically manage the bi-directional IP QoS of their IP flows and to dynamically manage their IP VPN services. That is, bi-directional IP QoS comprises managing IP flows in both directions across an access network. In order to dynamically control QoS in both directions across the access network, a D-VPN enabled device should be used at each end of the access link. The device on the customer premises manages the QoS in the direction towards the ISP core network. The ISP's edge device manages the QoS in the direction towards the customer.

In addition, a set of Application Programming Interfaces (APIs) is provided that can be invoked by applications to perform Dynamic IP VPN management activities without human intervention. Applications are therefore able to hide the complexities of IP VPN management from end-users by utilizing these APIs. As will be seen from subsequent examples, this set of D-VPN management APIs enables the transparent management of IP VPNs from an end user perspective, thereby providing customized, on-demand IP VPN services to the end-user. Finally, this transparent management of IP VPN services enables many more end-users to reap the benefits of IP VPN services than do so today. In one embodiment, the API is executed within an Enhanced Application Portal (discussed below). Those skilled in the art, and informed by the teachings of this disclosure, will realize that the API may be executed in any of the processing components or servers providing the communications, storage and processing requirements discussed herein.

Figure 3:
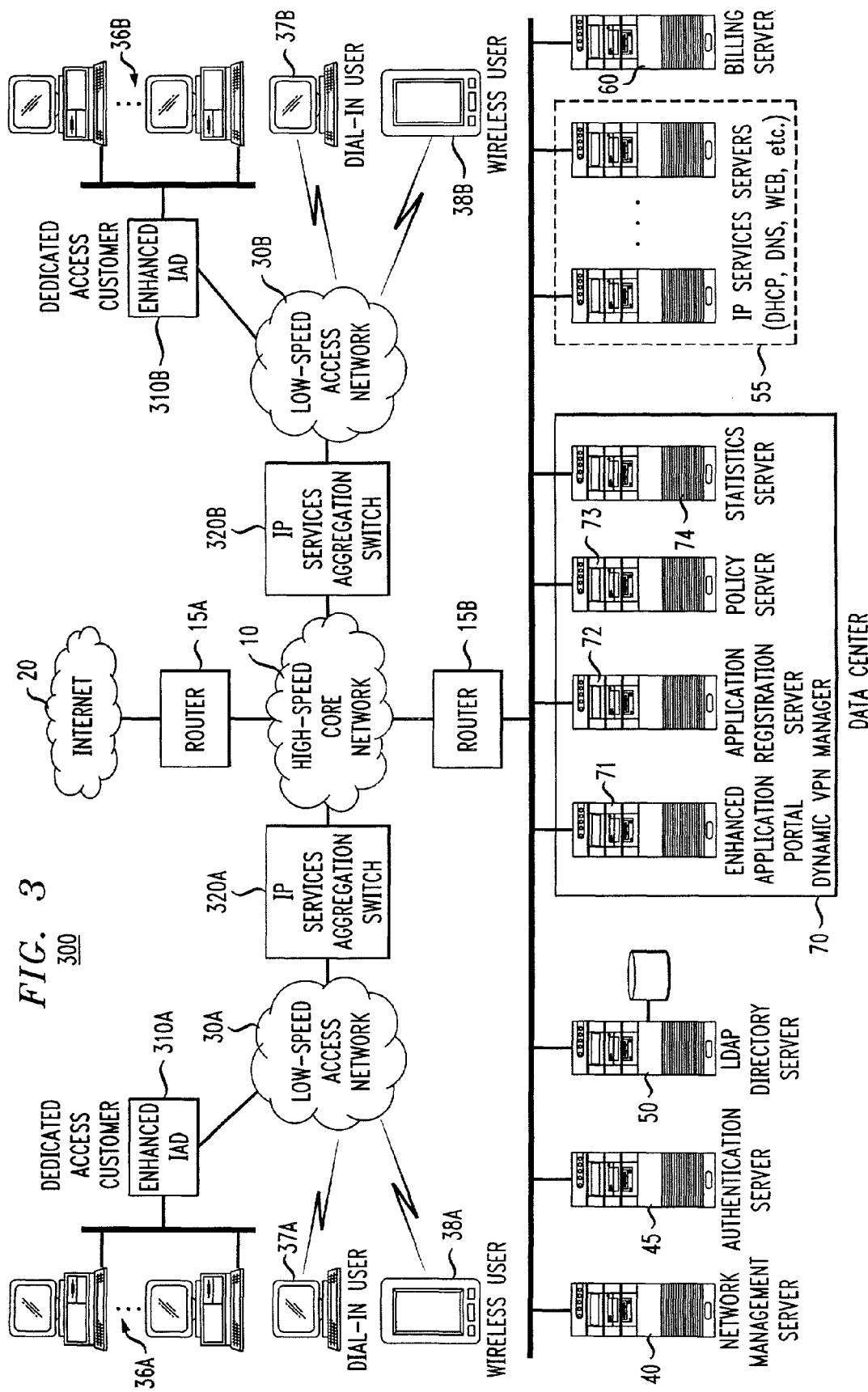
FIG. 3 depicts a high level block diagram of an ISP network architecture adapted in accordance with an embodiment of the invention.

FIG. 3 depicts a high level block diagram of an ISP network architecture modified in accordance with an embodiment of the present invention. Specifically, FIG. 3 depicts the architecture described above with respect to FIG. 1 further modified in accordance with an embodiment of the invention. Functional elements common to both FIGURES and described above with respect to FIG. 1 will not be discussed in additional detail herein.

In the architecture 300 of FIG. 3, a first group of dedicated access customers 36A communicate with a low speed access network 30A via an enhanced integrated access device (IAD) 310A. Similarly, a dial-in user 37A and wireless user 38A communicate with the low speed access network 30A via respective communications links. The low speed access network 30A communicates with a high speed core network 10 via an IP services aggregation switch 320A. The high speed core network 10 communicates with the Internet 20 via a router 15A, and with a data center or ISP NOC via a router 15B.

The data center includes a network management server 40, an authentication server 45, a Directory Server (which may or may not be an LDAP Directory Server) 50, various IP services servers 55, a billing server 60 and a Dynamic VPN manager 70. The Dynamic VPN manager 70 comprises an enhanced application portal 71, an optional application and registration server 72, a policy server 73 and a statistics server 74.

FIG. 3 also includes a second group of dedicated access customers 36B communicating with a second low speed access network 30B via a second enhanced IAD 310B. Similarly, a second dial-in user 37B and second wireless user 38B communicates with the low speed access network 30B. The second low speed access network 30B communicates with the high speed core network 10 via a second IP services aggregation switch 320B. It will be appreciated that many IP services aggregation switches 320 may be employed to effect communications between the high speed core network 10 and other low speed access networks 30 (not shown) with each low speed access network 30 serving a respective group of customers 36, 37 and/or 38 (not shown).

Figure 1:
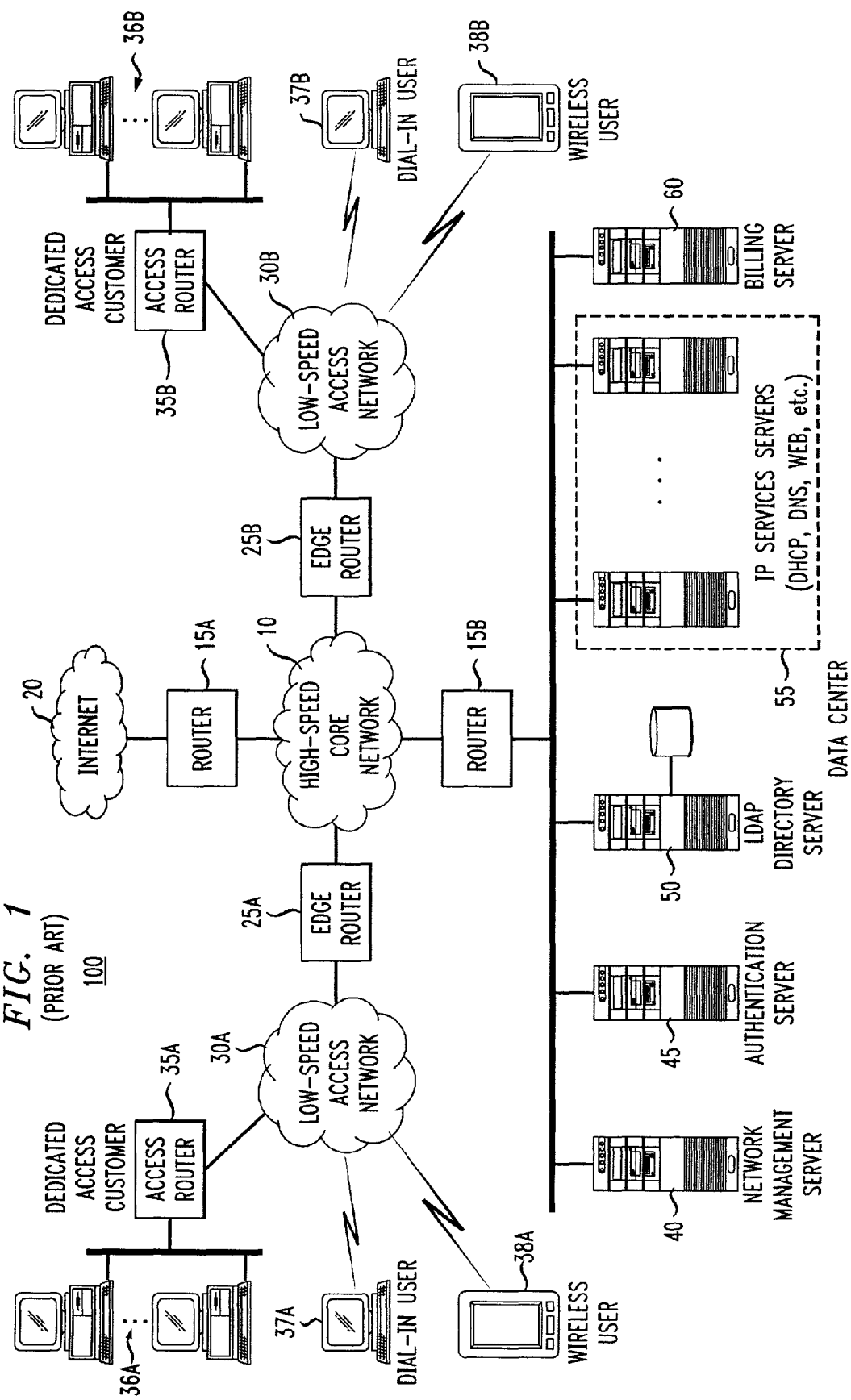
FIG. 1 depicts a high level block diagram of a typical Internet Service Provider (ISP) network architecture.

The architecture 300 of FIG. 3 differs from the architecture 100 of FIG. 1 in that the architecture 300 of FIG. 3 includes a Dynamic VPN manager 70, replaces the customer access routers 35 with enhanced services aggregation switches 320B and performs various functions which will be described in more detail below.

It is noted that the D-VPN technology of the present invention may also be incorporated in end-user remote or wireless devices, depending on the device's processing power. However, even if the device's processor isn't capable of supporting D-VPN technology, the end-user may still utilize network-based D-VPN services provided by the IP Services Aggregation Switch.

The enhanced IAD 310 has the combined functionality of an access router as well as the capability to provide converged access to next generation network services, such as converged voice and data. Each Enhanced IAD 310 is managed by the ISP and is used to connect the customer to the ISP's access network 10. The Enhanced IAD 310 is the demarcation point for all services provided by the ISP and provides the interfaces to support these services. Therefore, in addition to Ethernet (10/100Base-T, Gigabit Ethernet), the Enhanced IAD 310 should provide one or more customer-facing POTS, Private-Line (T-1/FT-1), Channelized DS-1, Frame Relay and other interfaces. The Enhanced IAD 310 is responsible for aggregating and converting these services into the format required by the access network.

The Enhanced IAD 310 also supports IP services such as routing, IP QoS, IP VPN, Encryption, and Tunneling. It provides key IP services on IP flows that are flowing away from the customer and towards the access network. The Enhanced IAD's IP VPN and QoS configurations can be managed by a policy server and the Enhanced IAD also collects statistics that can be used for billing purposes and SLA verification and management.

The IP Services Aggregation Switch 320 provides advanced IP services on IP flows that are flowing towards the customer. The combination of Enhanced IAD and IP Services Aggregation Switch provides the bi-directional aspect of Dynamic IP VPN services. The IP Services Aggregation Switch also provides the endpoints for network-based D-VPN Enhanced IADs and have an unmanaged access link to the ISP's edge. The IP Services Aggregation Switch's IP VPN and QoS configurations can be managed by a policy server and the IP Services Aggregation Switch also collects statistics that can be used for billing purposes and SLA verification and management. The IP Services Aggregation Switch provides network edge functionality for many customers.

The Dynamic VPN Manager 70 implements the Customer Network Management and Policy Server functions described above with respect to FIG. 2. It comprises an Enhanced Application Portal 71, optional Application Registration Server 72 and Policy Server 73. These elements can be kept on separate hardware platforms or collapsed onto one platform as software modules.

The Enhanced Application Portal 71 provides a single, web-based user interface for D-VPN services. The user interface may be adapted in operation to existing portals, such as Netscape's NetCenter. However, unlike existing portals, the Enhanced Application Portal 71 is able to direct the configuration of network elements. The Enhanced Application Portal communicates with the Directory Server to access profile information when an IP VPN service is requested, and interfaces to a billing server to record the use of value-added services.

In one embodiment, the Enhanced Application Portal provides an interface with greater network management capabilities that would be accessed by ISP personnel. In other words, ISP network management personnel would access the same Enhanced Application Portal as ISP subscribers do. Based on their login credentials an RBAC authentication system instructs the Enhanced Application Portal to provide ISP network management personnel with additional management capabilities (e.g., management access to the entire ISP network) than those provided to the ISP subscriber. Therefore, the ISP is advantaged by only needing to deploy one IP VPN management system rather than a management system for their subscribers (possibly one management system per customer) and a separate management system for the ISP network management personnel.

The optional Application Registration Server 72 is used by Application Server Providers (ASPs) to load their application into the ISP network. Information about how the application is accessed and billed, as well as the application profiles, are loaded into the Directory Server by means of the Application Registration Server.

The Policy Server 73 downloads policies to the network elements 260, the Enhanced IADs 310 and IP Services Aggregation Switches 320. The Policy Server extracts profiles from the directory, converts them into commands understood by the different network elements 260, and downloads these commands to the network elements when requested by the Enhanced Application Portal 71.

The remaining servers in the Data Center provide the support structure for D-VPN. The Directory Server 50 is where user authentication information, application profiles, and all other network information is stored. The Statistics Server 74 is used to collect traffic information for SLA verification and provides a web-based user interface for customer access. The Network Management Server 40 implements the Element Management System functionality described above with respect to FIG. 2 and is used to configure the network elements 260. The Billing Server 60 records value-added service access information for eventual processing by down-stream billing systems.

IP VPN services use tunneling and security technology to overlay a virtual network on top of a publicly available IP network. Various classes of IP VPN topologies are used, such as end-to-end services, network-based services, and hybrid services. The difference between the topology classes rests with where the endpoints of their tunnels reside. End-to-end topologies have their tunnel endpoints on the customer premises. Network-based topologies have their tunnel endpoints in the ISP's network, typically in their edge routers. Hybrid topologies have some tunnel endpoints on the customer premises and some in the ISP network. By incorporating D-VPN technology in customer premises devices and ISP edge routers, the dynamic management of these classes of IP VPN topologies is enabled.

The inventors contemplate that the users of D-VPN technology include ISPs and, primarily, their business customers (though residential customers may also benefit). Business customer users include both VPN Administrators and end-users. The ISP's operations staff will use these D-VPN capabilities to manage their own IP VPNs, and to manage IP VPNs they sell to business customers who prefer that the ISP manage their IP VPNs. Residential end-users will also benefit from certain aspects of D-VPN technology; namely, the application controlled management of IP VPNs described above.

Figure 4:
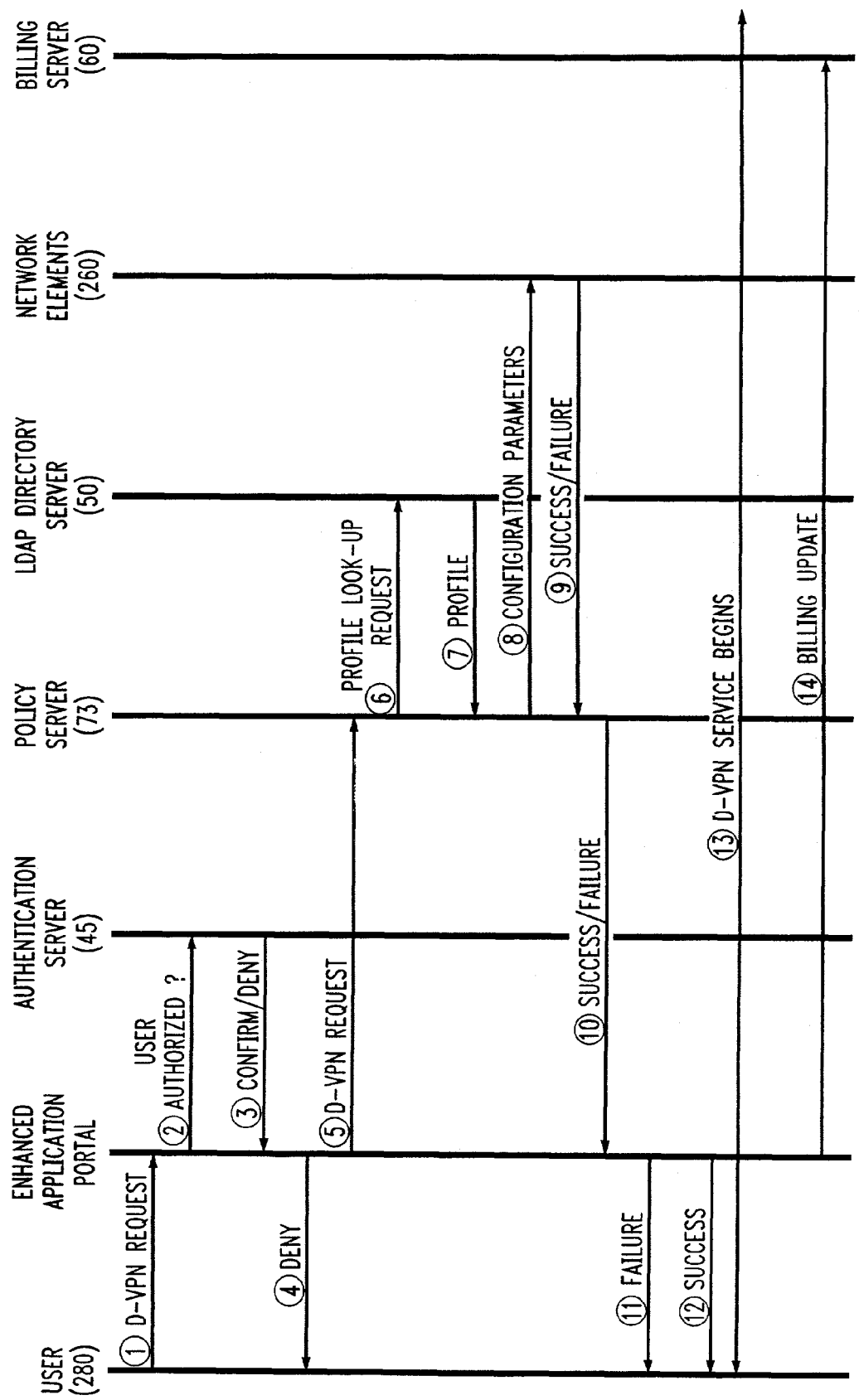
FIG. 4 diagrammatically depicts message flow through a D-VPN enabled network in response to a user request for D-VPN services.

FIG. 4 diagrammatically depicts message flow through a D-VPN enabled network in response to a user request for D-VPN services. Depending on the type of request, the user in the following discussion may be a D-VPN Administrator or an end-user as described above with respect to FIG. 2.

The user's D-VPN Request is received by the Enhanced Application Portal (1), which forwards an authorization request (2) to the ISP's Authentication Server. The Authentication Server returns (3) a confirm or deny response based on the user's authorization level. If the authorization is denied, the Enhanced Application Portal returns (4) an appropriate message to the user.

Otherwise, the D-VPN Request is forwarded (5) to the Policy Server, which requests that (6) the Directory Server retrieve the specified profile from the directory. The Directory Server returns (7) the profile to the Policy Server, which converts the profile into configuration parameters for the affected network elements. The Policy Server then transmits (8) the configuration parameters to the network elements. Each network element returns (9) a success or failure indication back to the Policy Server in response to the configuration request.

If the configuration request failed for any network element, the Policy configuration that was in place prior to the user issuing the D-VPN Request. The Policy Server returns (10) the result of the configuration effort back to the Enhanced Application Portal. The Enhanced Application Portal returns (11, 12) the results of the configuration request back to the user. The Billing Server (14) is notified upon successful completion of the D-VPN Request. Absent the failure of a network element configuration request (or other failure), the Dynamic Virtual Private Network Service is initiated (13).

D-VPN Framework and Example D-VPN Enabled Services

The Dynamic IP VPN technology of the present invention places IP VPN management into the hands of the subscriber and Network Operations personnel. A VPN Administrator or end-user can surf or graphically navigate to a web page and create, modify, or delete IP VPN services on-demand. Once these modifications have been submitted, configuration of network elements occurs automatically and the new IP VPN parameters instantaneously take effect.

In addition, the D-VPN technology supports QoS parameters such as bandwidth, delay, and jitter, as well as security capabilities such as encryption, authentication, and filtering. To facilitate the provisioning of these types of services, in one embodiment the ISP supplies QoS and security provisioning templates (i.e., profiles) that are accessed by the customer to apply QoS and security parameters to their underlying Dynamic IP VPN topology. For example, a security profile contains predefined values for parameters used in the establishment of IPSec tunnels. The provisioning templates also help the ISP manage the build-out of their networks by limiting the number of QoS and security choices that users may make.

Network-based applications, such as videoconferencing, are associated with an Enhanced Application Portal, whereby an application's selection implicitly specifies its connectivity, QoS, and security profile. This configuration parameters are pushed to relevant network elements on demand as part of making the application available to a subscriber.

SLA verification information is stored on-line for web-based access by the customer. Billing information is captured and stored for the ISP to enable Usage-based Billing. The billing records contain the value-added service accessed by the customer, when the value-added service began, and its duration.

The above-described D-VPN technology is an enabling technology. The following four services, for example, are based on this technology:

1. On-demand IP Bandwidth Management. ISP subscribers and network management personnel are able to request that a specific amount of bandwidth be provided to an IP flow across the ISP's access network. The ISP's network is automatically configured to guarantee at least the requested amount of bandwidth to the IP flow.
2. Dynamic IP VPN Management. IP VPN management includes the management of an IP VPN's topology, security, and QoS configuration. ISP subscribers and network management personnel are able to create, activate, modify, deactivate, and delete IP VPN services on demand. The ability to apply temporal and repetitive parameters is supported as well, such as specifying that an IP VPN service automatically be made available every Friday from 6 pm-midnight. The ISP's network is automatically configured in response to these IP VPN management requests.
3. Network-Based Application Management and Subscription. Authorized ASP and ISP personnel are able to store application profiles in the ISP's network. ISP subscribers are able to select these applications and the ISP's network is automatically configured to provide the network-based application to the subscriber as per the application profile.
4. Dynamic ISP Network Security Policy Management. ISP personnel can create, activate, modify, deactivate, and delete security network is automatically configured in response to these Security Policy Management requests. These security policies may be deployed in order to respond to newly identified threats on the network (e.g., network intrusions) or to implement role-based security by means of IP VPN closed user groups (e.g., only a subset of the ISP's network management personnel are allowed access to the router management IP VPN).

The following sections describe three example service offerings that are enabled by Dynamic IP VPN technology: (1) Guaranteed Bandwidth, (2) Customer IP VPN Management, and (3) On-Demand Application Subscription. It should be noted that although the descriptions refer to dedicated access customers, the framework is the same for remote and wireless customers as well.

Guaranteed Bandwidth Service

The Guaranteed Bandwidth service is used to provide bi-directional, layer-3 bandwidth management across an access network that has limited bandwidth; for example T-1 access or DSL access. The Guaranteed Bandwidth service allows an end-user to guarantee levels of bandwidth to certain IP flows. For example, to ensure that a file transfer receives 384 Kbps of bandwidth out of a 1.5 Mbps T-1 access link. It should be noted that every end of an IP flow must traverse an access link and that this service can therefore be used to manage the bandwidth for each of these access links.

Figure 5:
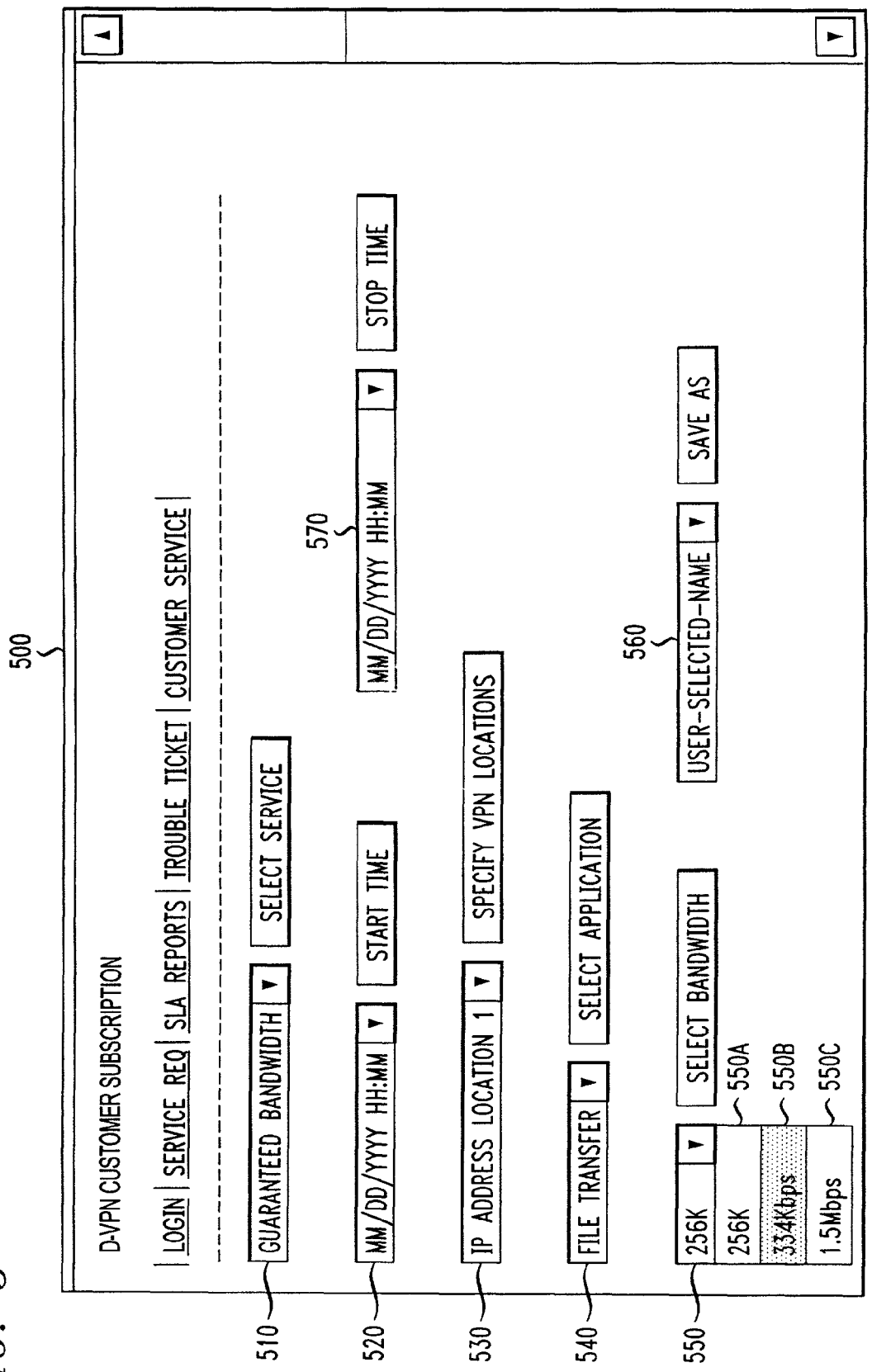
FIG. 5 depicts an exemplary user interface screen adapted to a guaranteed bandwidth service.

FIG. 5 depicts an exemplary user interface screen adapted to a guaranteed bandwidth service. Specifically, the user interface 500 of FIG. 5 includes a service selection object 510, a start time object 520, a stop time object 570, a VPN location specification object 530, an application selection object 540, a bandwidth selection object 550 and a VPN name specification object 560. As shown in FIG. 5, a drop-down menu associated with the bandwidth selection object 550 is shown to include selections are denoted as, respectively, 550A, 550B and 550C. The end-user selects the "Guaranteed Bandwidth" service and is provided the option of specifying a start-time and duration (based on the end time) for the bandwidth guarantee. Next, the user identifies the IP flow by specifying the flow's source and destination endpoints, and the IP application (e.g., FTP) or, optionally, the flow's protocol and port numbers. Finally, the user selects the flow's bandwidth from a drop-down menu and is given the option of naming and saving this bandwidth guarantee for future use 560.

Once the bandwidth guarantee has been named and saved for future use, it can be activated using a screen similar to that depicted by FIG. 12 (described below). It can also be recalled, modified, and stored again using a screen similar to FIG. 5.

Figure 6:
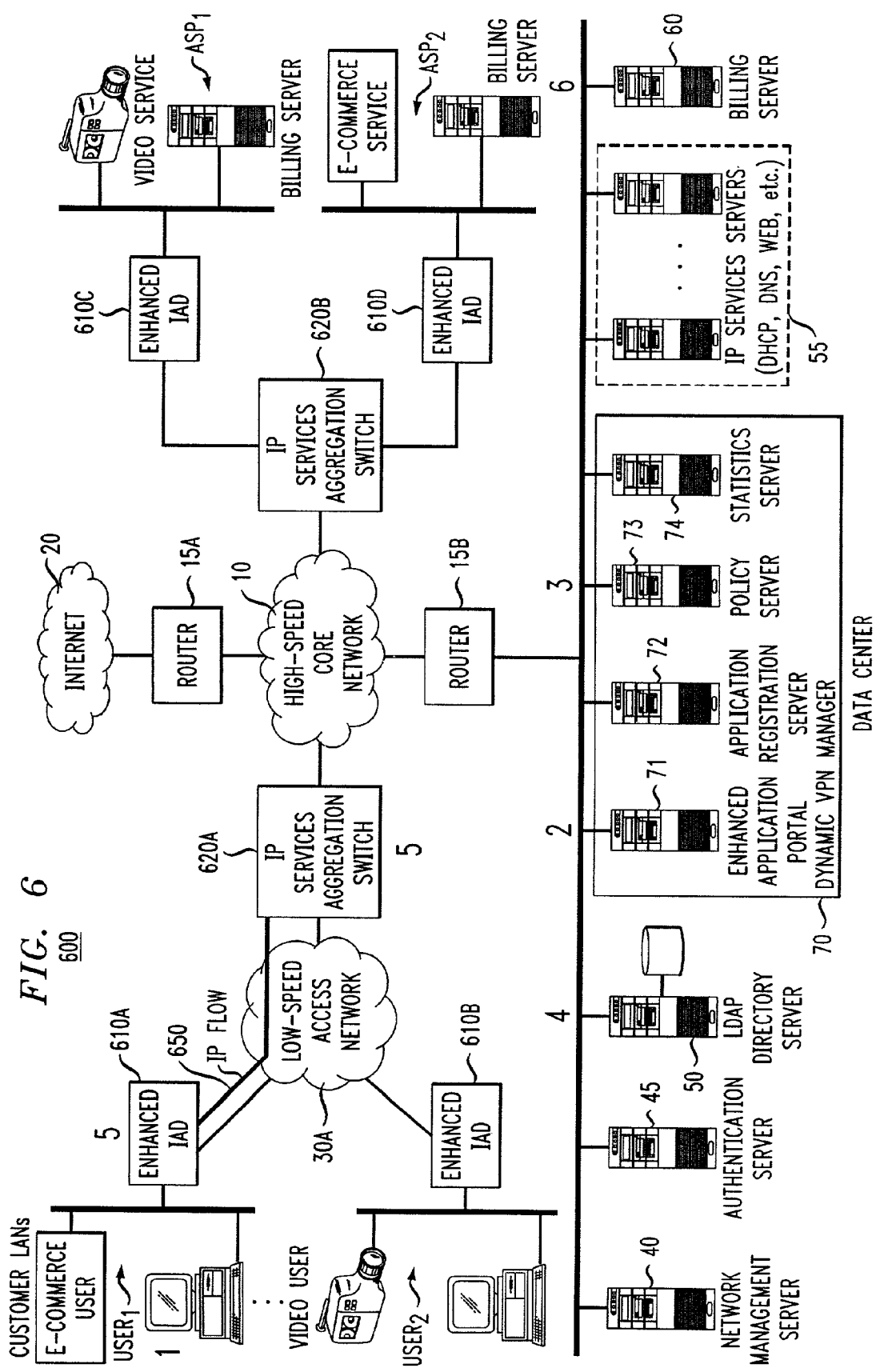
FIG. 6 depicts a framework suitable for use in providing a guaranteed bandwidth service.

FIG. 6 depicts a framework suitable for use in providing a Guaranteed Bandwidth service. The framework 600 of FIG. 6 comprises a high level block diagram of an exemplary architecture and further includes numerical designations indicative of a sequence of actions used to effect the guaranteed bandwidth service. Specifically, the architecture depicted in FIG. 6 comprises a first user $USER_1$, illustratively an e-commerce user communicating with the low speed access network 30A via a first enhanced IAD 610A and a second user $USER_2$ communicating with the low speed access network 30A via a second enhanced IAD 610B. The low speed access network 30A communicates with a high speed core network 10 via a first IP services aggregation switch 620A. A first application services provider $ASP_1$ communicates to a second IP services aggregation switch 620B via a third enhanced IAD 610C, while a second application services provider $ASP_2$ communicates with the second IP services aggregation switch 620B via a fourth enhanced IAD 610D. The first ASP ($ASP_1$) comprises, illustratively, a video service provider, while the second ASP ($ASP_2$) comprises, illustratively, an e-commerce service provider. The architecture 600 of FIG. 6 also includes various previously-described ISP equipment 40 through 70 communicating with the communicating between the high speed core network 10 and the Internet 20.

For purposes of this discussion, it is assumed that the first user $USER_1$ desires a guaranteed bandwidth service, illustratively an e-commerce service from the second application service provider $ASP_2$. The guaranteed bandwidth service is provided as follows: (1) The first user $USER_1$ contacts the enhanced application portal 71 within the Dynamic VPN Manager 70 of the data center. This contact occurs via a web-based interface, to request, modify or delete a bandwidth guarantee for a certain IP flow across the low speed access network 30A. (2) The enhanced application portal authenticates the user and verifies that the user is authorized to request a bandwidth guarantee. The user interacts with a user interface screen (such as described above with respect to FIG. 5) to specify the IP flow and bandwidth, which the enhanced application portal 71 then forwards to the policy server 73. If the user is requesting a predefined bandwidth profile, then (3) the policy server 73 retrieves the profile from the Directory Server 50, converts the policy into commands understood by the IP services aggregation switch 620 and enhanced IAD 610, and transmits the policy to these devices. If the user is requesting a new bandwidth guarantee, the policy server transmits the new request to the appropriate network elements in the command form adapted to these network elements. In this instance, the user is given the option of (4) naming and storing the new bandwidth specification in the directory for future use. If either the enhanced IAD 610 or IP services aggregation switch 620 cannot satisfy the request, then the device(s) unable to satisfy the requests informs the policy server 73 of this condition and the operation is aborted. The end user is then informed of the termination of the operation.

If the request is successful, the enhanced IAD 610 and IP services aggregation switch 620 are configured (5) to provide the requested bandwidth to the specified IP flow. The end user is informed of the successful processing of the guaranteed bandwidth request, and the billing the bandwidth guarantee is terminated, either by the end user or by the expiration of a duration parameter, the enhanced application portal 71 directs the policy server 73 to return the enhanced IAD 610 and IP services aggregation switch 620 to their default settings for the specified IP flow, and the billing server 60 is directed to cease billing for the service.

Thus, in the above example, an IP Virtual Private Network 650 is dynamically configured by the first user $USER_1$ to place the user in communication with the high speed core network 10. Also in communication with the high speed core network 10 is the application service provider $ASP_2$ (in this example) providing the desired service. ISP network management personnel can also use this same procedure to provide bandwidth guarantees between users and ASPs thereby streamlining their current mode of operation, which today requires many activities in order to do so.

Customer IP VPN Management Service

Customer IP VPN Management allows customer VPN Administrators to create, modify, and teardown IP VPN services on demand. VPN Administrators can specify the endpoints, QoS and security level of the IP VPN service as well as the creation time and duration of the service and save this IP VPN Service Definition for future use. Customer IP VPN Management also supports a "repeat" function whereby the VPN Administrator can specify that an IP VPN service of a given duration be created at repetitive times, such as every week, month, or year.

The ISP can also provide a limited set of QoS, or class of service, profiles (for example, Platinum, Gold, Silver, Bronze, etc.) and security profiles (for example, Top Secret, Secret, Confidential, etc.) that may be applied to the IP VPN service. A QoS profile contains values for the bandwidth, delay, jitter and the like that would be applied to the service. The security profiles specify the type of encryption, the type of tunneling, the packet discard policy and the like that are used by the IP VPN service.

Figure 7:
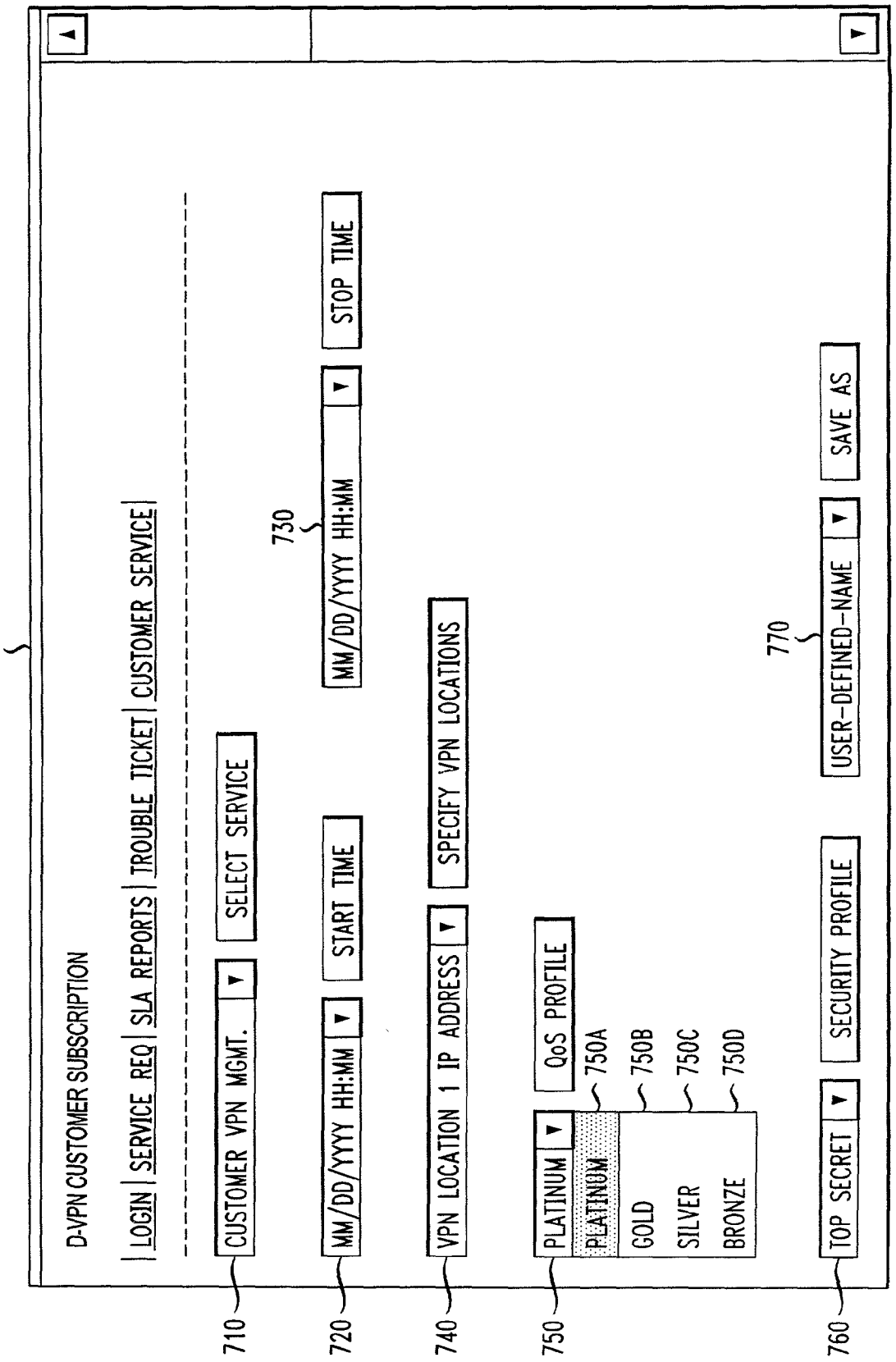
FIG. 7 depicts an exemplary user interface screen suitable for use by a VPN Administrator to dynamically manage IP VPNs.

FIG. 7 depicts an exemplary user interface screen adapted for use by a VPN Administrator for managing IP VPNs. Specifically, the user interface 700 of FIG. 7 includes a customer selection object 710, a start time object 720, a stop time object 730, a VPN location specification object 740, a quality of service profile object 750, a security profile object 760 and a VPN name specification object 770. As shown in FIG. 7, a drop down menu associated with the QoS profile object 750 is shown to include available selections of platinum 750A, gold 750B, silver 750C and bronze 750D levels of QoS. In one embodiment, the QoS levels 750A are highest while the QoS levels 750D are lowest. The VPN Administrator selects the "Customer VPN Management" service. They can specify the start time and duration of the IP VPN, the IP VPN locations (IP addresses), QoS and security profiles. The QoS shown in the above screen is categorized into Platinum, Gold, Silver and Bronze. Each category is predefined to suit a particular application with appropriate delay, jitter and bandwidth. Similarly a security profile will have predefined encryption and tunneling schemes. Finally, the VPN Administrator is given the option of naming and saving this Dynamic IP VPN for future use 770.

Once the Dynamic IP VPN has been named and saved for future use, it can be activated using a screen similar to that depicted by FIG. 13 (described below). It can also be recalled, modified, and stored again using a screen similar to FIG. 7.

ISP network management personnel can also use this same procedure to manage IP VPNs for their customers thereby streamlining their current mode of operation, which today requires many activities in order to do so.

Figure 8:
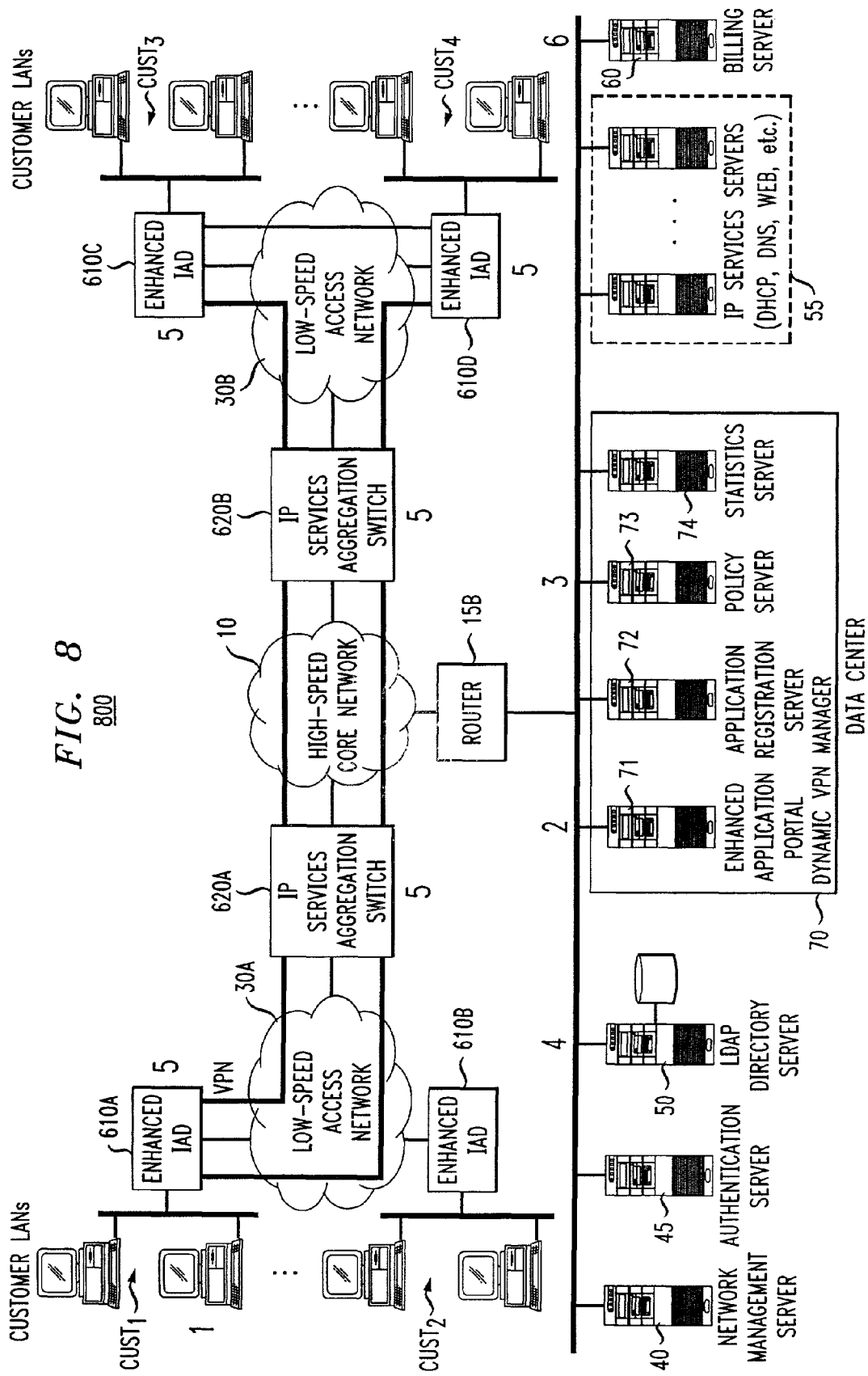
FIG. 8 depicts a framework for customer-based IP VPN management service.

FIG. 8 depicts the framework for the Customer IP VPN Management service. The framework 800 of FIG. 8 comprises a high level block diagram of an exemplary architecture and further includes numerical designations indicative of a sequence of actions used to effect the Customer IP VPN Management Service. The architecture depicted in FIG. 8 is similar to that previously described with respect to FIG. 6. 600 of FIG. 6 in that each of the enhanced IADs 610 is coupled to a respective customer local area network (LAN). In operation, a VPN Administrator (1) contacts the Enhanced Application Portal (2), via a web-based interface, to create, modify, delete, activate, or deactivate a Dynamic IP VPN service. The Enhanced Application Portal authenticates the administrator and verifies that they are authorized to manage Dynamic IP VPN services. The VPN Administrator manages a D-VPN by filling out a web page (such as described above with respect to FIG. 7) that specifies the IP VPN service's name, endpoints, security profile, QoS profile, creation, and duration information. The Enhanced Application Portal then forwards the D-VPN information to the Policy Server (3) for storage in the directory (4).

If a VPN Administrator makes a request to activate or deactivate a Dynamic IP VPN service, the Enhanced Application Portal forwards the request to the Policy Server. The Policy Server retrieves the service information from the directory, converts it into the appropriate commands and pushes these commands out to the affected network elements (5). If any affected network element cannot satisfy the request, it informs the Policy Server, the operation is aborted, and the VPN Administrator is informed.

Otherwise, at this point, the affected Enhanced IADs and IP Service Aggregation Switches will have been configured with the appropriate filters, QoS parameters, and security parameters to satisfy the Customer IP VPN Management request. The end-user is informed of the successful processing of the request and the Billing Server (6) is notified of the Customer IP VPN Management service activity. When an active D-VPN is torn down, either by the VPN Administrator or by the expiration of its duration, the Enhanced Application Portal directs the Policy Server to remove the D-VPN's configuration parameters from the affected network elements and informs the Billing Server to stop billing for this service.

On-Demand Application Subscription Service

Network-based applications can be provided by Application Service Providers (ASPs). For this ISP service, an application must first be registered with an Internet Service Provider before it can be accessed by the ISP's end-users. After the ASP and ISP have reached a business agreement to offer the ASP's application on the ISP's network, the ISP will probably require that the application undergo an acceptance testing procedure to ensure that the application functions as advertised and that it does not have any negative effects on the ISP's network. Once the acceptance testing procedure has been completed, the application is ready to be registered on the ISP's network.

Registering the application with the Internet Service Provider allows the ASP to store an application profile that describes the connectivity, security, QoS, and billing information required by the application. Multiple profiles can be stored for the same application, reflecting different qualities of service, levels of security, and billing rates for the application. Once an application has been registered, it is available for use by the ISP's customers. End-users can access the application on-demand, for example an archived video stream, or they can request that the application be made available at a certain time for a specified duration, for example schedule a videoconference. Billing reconciliation takes place between the ISP, acting as the retailer of the service, and the ASP, acting as the wholesaler of the service.

Figure 9:
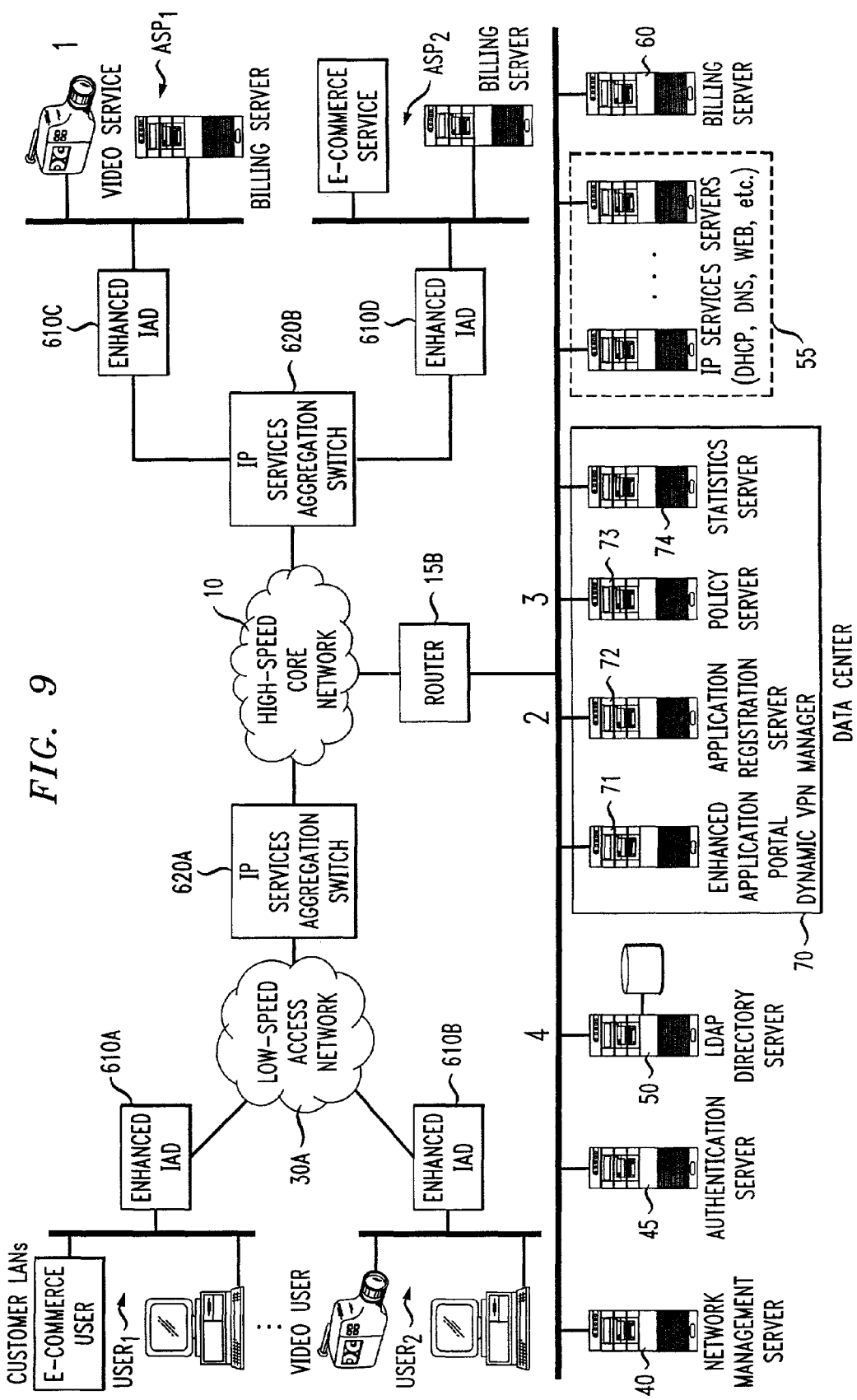
FIG. 9 depicts a framework for an Application Services Provider (ASP) to register an application with an ISP that provides the D-VPN service.

FIG. 9 depicts the framework for registering an application with an ISP. The framework 900 of FIG. 9 comprises a high level block diagram of an exemplary architecture and further includes numerical designations indicative of a sequence of actions used to effect the application subscription service. Specifically, the architecture 900 of FIG. 9 is similar to the architecture 600 of FIG. 6, though there is no access to the Internet shown in FIG. 9 (the ISP can provide access to the Internet, it simply is not shown in FIG. 9). An ASP's network administrator (1) contacts the ISP's Application Registration Server (2) via a network. The Application Registration Server authenticates the ASP network administrator and verifies that they are authorized to manage applications. The ASP's network administrator manages an application by completing a web page that specifies the application's name, connectivity requirements, QoS and security profiles, activation time, duration information, and billing information. The Application Registration Server then forwards this application profile to the Policy Server (3) for storage in the directory (4).

Figure 10:
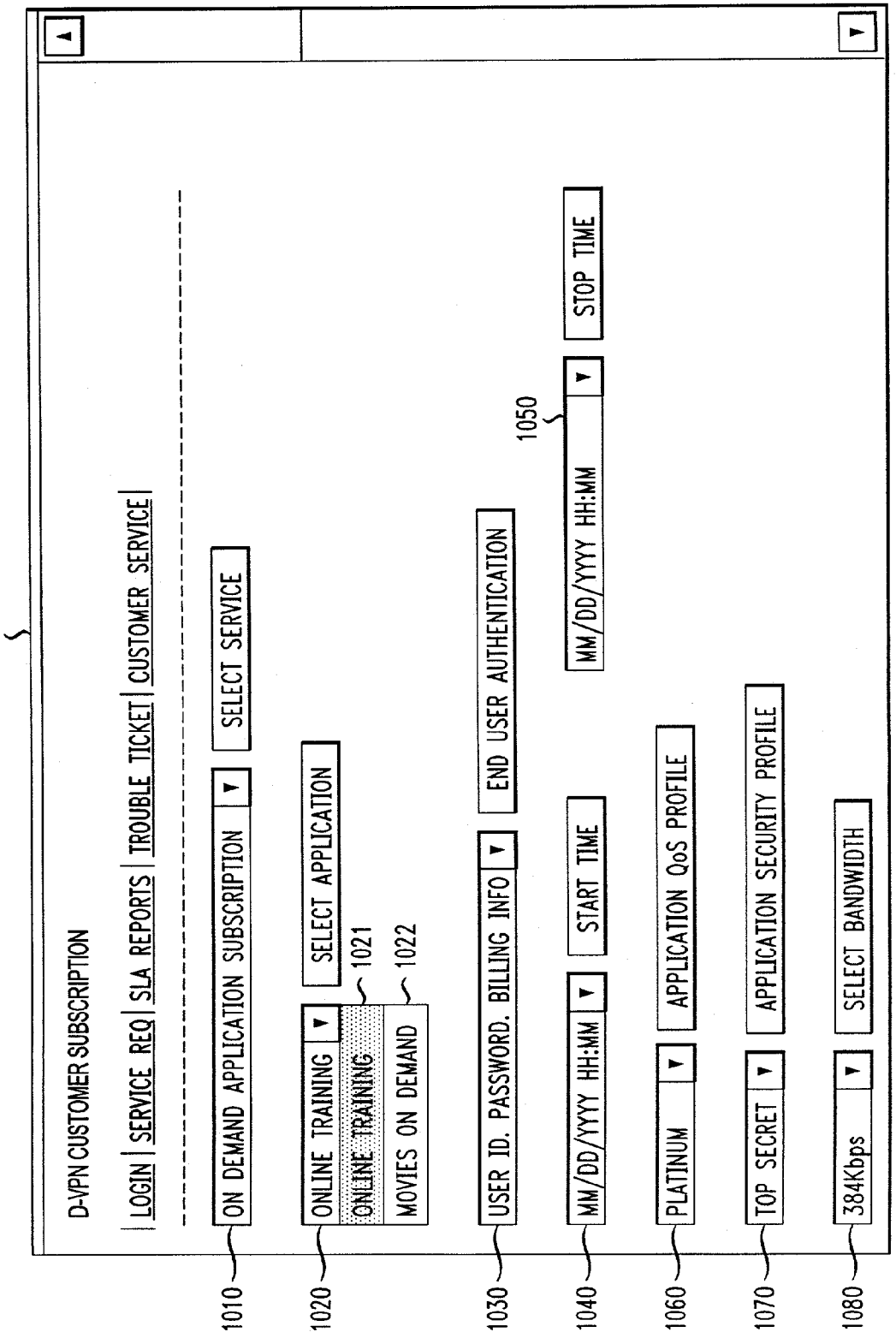
FIG. 10 depicts an exemplary user interface screen suitable for use by an end user accessing an application that is registered with an ISP.

FIG. 10 depicts an exemplary user interface screen adapted for use by an end-user accessing an application. Specifically, the user interface 1000 of FIG. 10 includes a service selection object 1010, an application selection object 1020, a user authentication object 1030, a start time object 1040, a stop time object 1050, an application quality of service profile object 1060, an application security profile object 1070, and a bandwidth selection object 1080. As shown in FIG. 10, a drop down menu associated with the application selection object 1020 is shown to include available selections of on-line training 1021 and movies on demand 1022.

The end-user selects the desired application and provides their identification and billing information. Once the user is validated by the ASP, application-specific information is displayed. This application-specific information is stored in a template associated with the application and user profile. For example, the end-user selects the QoS, security, and bandwidth from a list of alternatives associated with the application.

Figure 11:
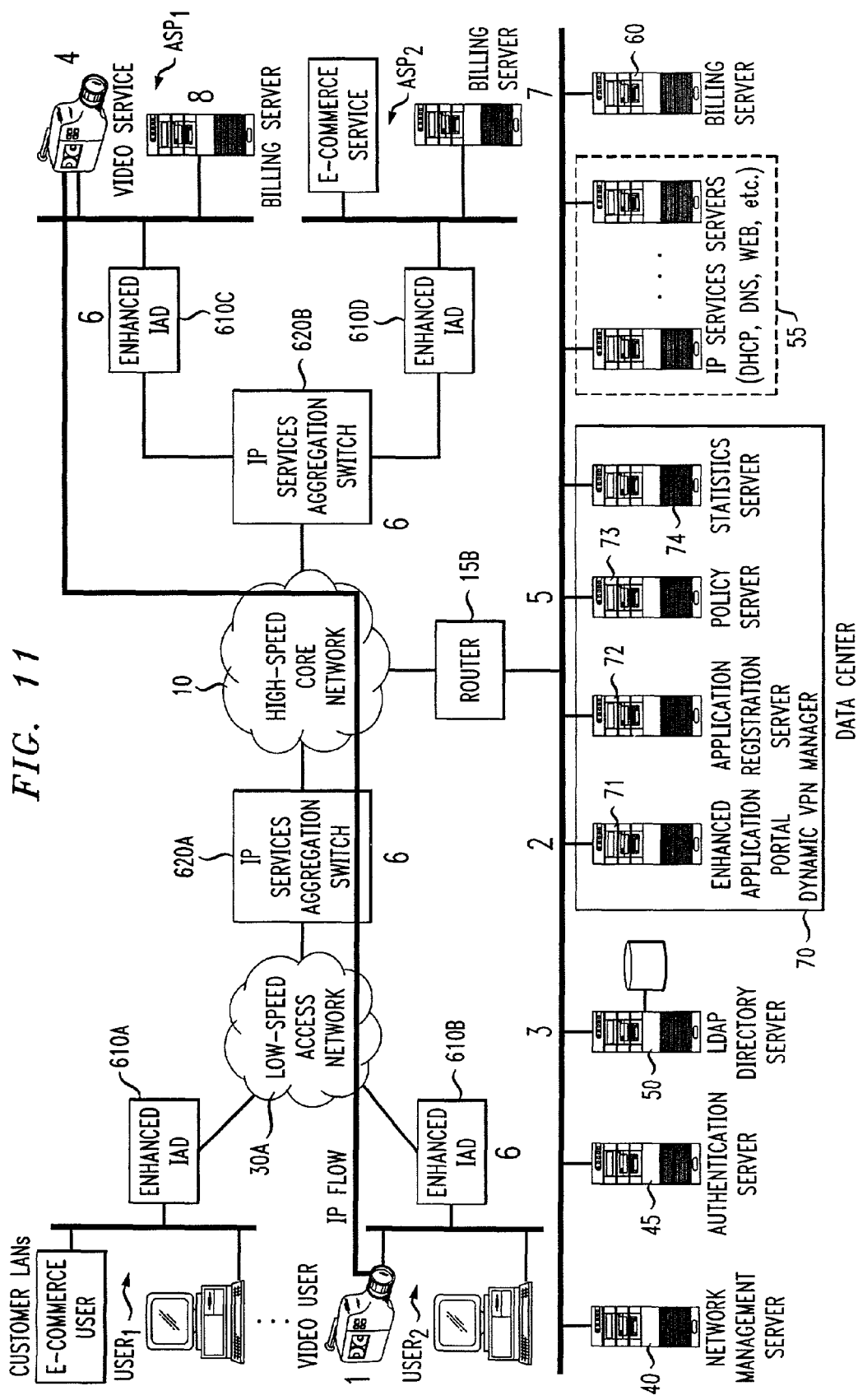
FIG. 11 depicts a framework for end-user application service selection.

FIG. 11 depicts the framework for end-user application service selection. The framework 100 of FIG. 11 comprises a high level block diagram of an exemplary architecture and further includes numerical designations indicative of a sequence of actions used to effect the selection of an application service. Specifically, the architecture 1100 of FIG. 11 is similar to the architecture 600 of FIG. 6. An end-user (1) contacts the Enhanced Application Portal (2) and chooses the desired application from a web-based menu. The Enhanced Application portal retrieves the additional application-specific information contained in the application profile. The Enhanced Application Portal forwards the application-specific information to the ASP (4).

The ASP authenticates the end-user and verifies the authorization to access the application. The ASP returns the result of the authentication and authorization procedure to the Enhanced Application Portal. If the end-user is not authorized to access the application, the Enhanced Application Portal forwards this information to the end-user. Otherwise, the Enhanced Application Portal forwards the application profile to the Policy Server (5), which converts the application profile into appropriate commands and pushes them out to the affected network elements (6).

If any affected network element cannot satisfy the request, it informs the Policy Server, the operation is aborted, and the end-user is informed. Otherwise, at this point, the affected Enhanced IADs and IP Services Aggregation Switches have been configured with the appropriate filters, QoS parameters, and security parameters to provide the desired connectivity between the end-user and ASP. The end-user is informed that they are now able to access the desired application. When the application finishes, either by end-user request or by the expiration of its duration, the Enhanced Application Portal directs the Policy Server to remove the application's configuration from the affected network elements.

The Enhanced Application Portal notifies the ISP's Billing Server (7) of the ASP application activity. Billing reconciliation takes place between the ISP's Billing Server and the ASP's Billing Server (8), according to the prearranged business agreement between the two parties.

Figure 12:
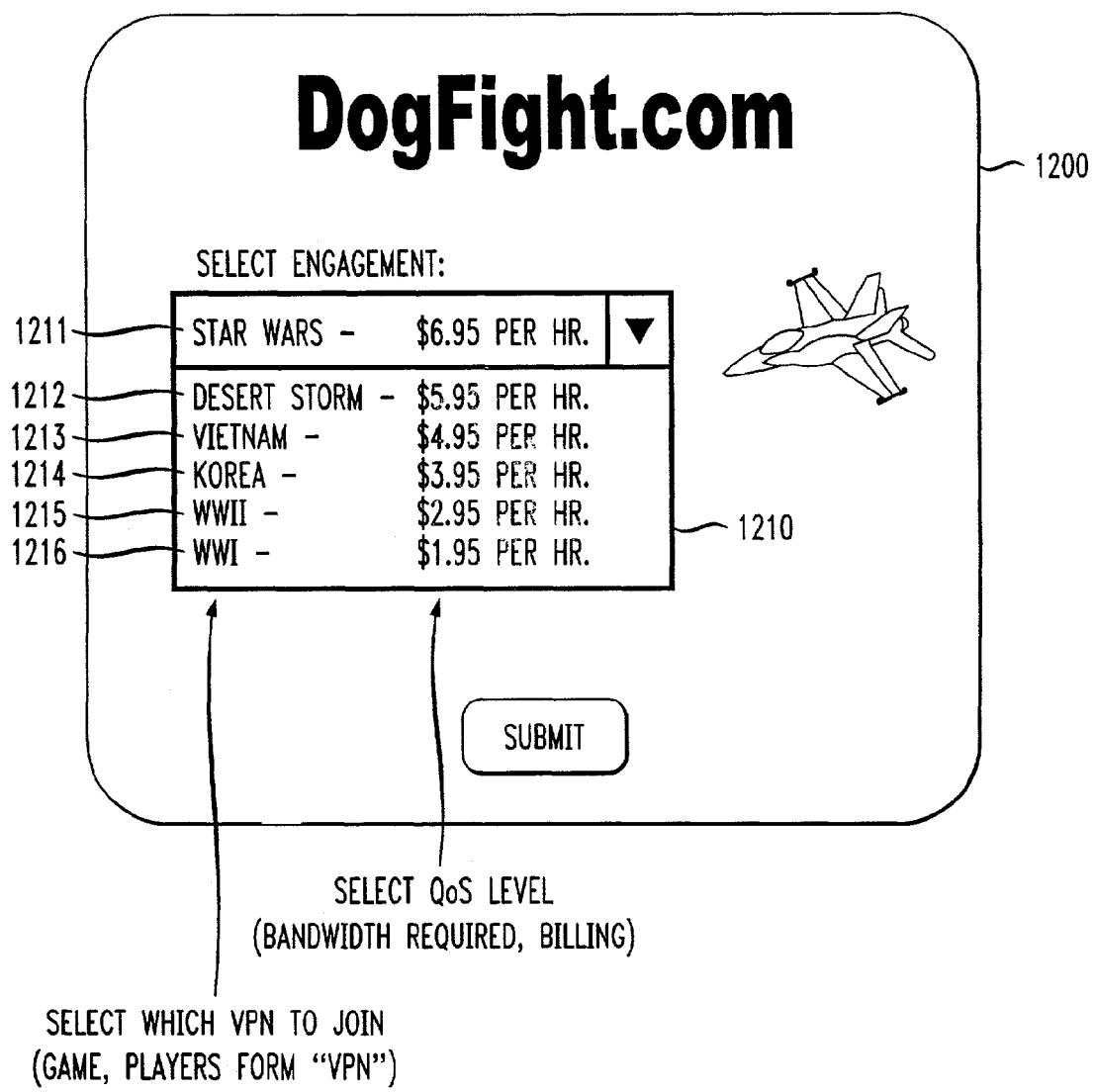
FIG. 12 depicts an exemplary user interface screen adapted to a gaming application.

FIG. 12 depicts an exemplary user interface screen adapted to a gaming application. Specifically, the user interface screen 1200 of FIG. 12 is adapted to a dog fight or flight simulator application that is implemented using different quality of service levels based upon the particular dog fight or flight simulator application chosen. As shown in FIG. 12, a pull down menu 1210 indicates that several types of Desert Storm engagement 1212, a Viet Nam engagement 1213, a Korea engagement 1214, a World War II engagement 1215 and a World War I engagement 1216. Each of these engagements is associated with a respective cost per hour ranging from $6.95 per hour for the Star Wars engagement down to $1.95 per hour for the World War I engagement. The prices reflect a rate associated with the quality of service level necessary to support the selected engagement (where the engagements are increasingly complex to provide). A user selecting a particular engagement is, in effect, selecting a particular IP VPN to join, where the Joined IP VPN may have many other players or may be interactive with a computer.

The gaming application (e.g., the dog fight or flight simulator application) invokes an application programming interface (API) which modifies the appropriate IP VPN to include the new user. When the user leaves the game, the application invokes another API to remove the user from the IP VPN. The API allows an application to perform the operations described for the Guaranteed Bandwidth (FIGS. 5 & 6), Customer IP VPN Management (FIGS. 7 & 8), and On-Demand Application Subscription (FIGS. 10 & 11) services without the need for manual intervention. The application utilizes the API to perform these operations transparently to the user, thus sparing the user of the complexities of IP VPN management. Hence, a user effects the management of an IP VPN simply by running an application that hides the IP VPN management from the user. The user doesn't even know they are managing an IP VPN. This is readily seen to be a powerful extension to the prior art, opening up the benefits of IP VPN services to a whole new class of users.

Various modifications to the D-VPN supporting the game may be made. For example, when the game becomes full a particular IP VPN may be closed such that the IP VPN is unable to be selected. For example, if the Desert Storm IP VPN is full, in one embodiment the Desert Storm selection is removed from the select engagement pull down menu 1210. In one embodiment, additional IP VPNs are generated to enable multiple games for The network may automatically create the various games, and only allow a predefined group of users to play the games on a regular basis. For example, if a group of friends wishes to compete at a predefined time, the above-described D-VPN technology allows reservation of the necessary network resources (connectivity, QoS, security and the like) at the predefined date and time. That is, the IP VPN is set up for the predefined group at a predefined interval, an IP VPN is provisioned and awaiting access by the members of the group. In this case, the IP VPN may be secured by preventing access from other players.

Figure 13:
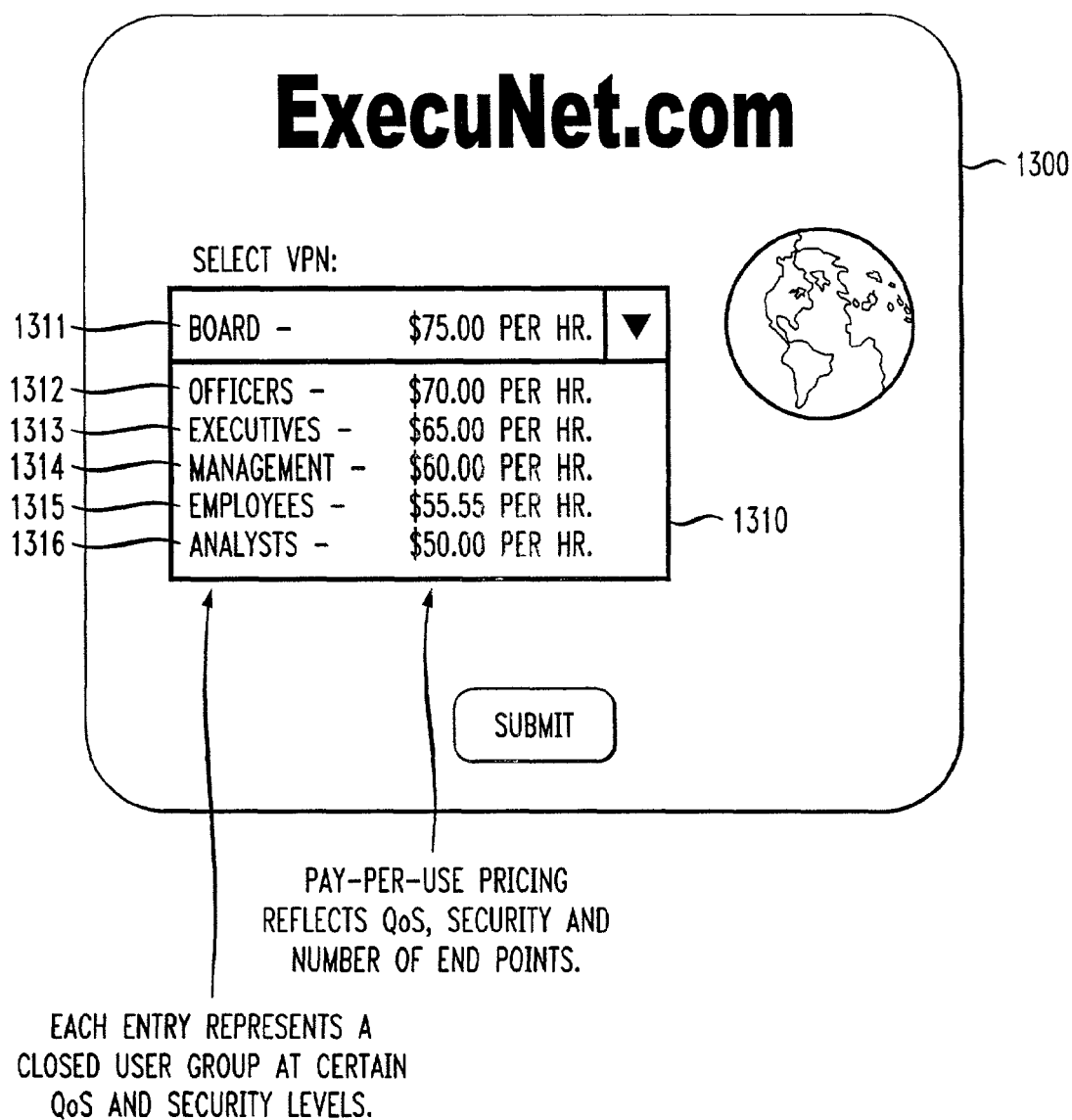
FIG. 13 depicts an exemplary user interface screen adapted to a conferencing application.

FIG. 13 depicts an exemplary user interface screen adapted to a conferencing application, such as a corporate conferencing application. The user interface 1300 of FIG. 13 includes a VPN selection object 1310 having selection entries for a board 1311, officers 1312, executives 1313, management 1314, employees 1315, and analysts 1316. Each of the selectable IP VPNs has associated with it a respective rate ranging from, illustratively, $75 per hour for the board selection 1311 to $50 per hour for the analyst's selection 1316. The pricing for the various selections represents the quality of service, security, and number of end points used in each of the IP Virtual Private Networks necessary to enable the respective conferencing applications. Each of the selectable IP VPNs represents a closed user group having a certain quality of service and security level.

The conferencing application is especially well-suited where sets of user groups need to communicate with each other via a secure means (such as an IP VPN) on a non-permanent but fairly regular basis. The D-VPN technology of the present invention allows these user groups (which may be modeled as a set of end-points) to be defined and stored in the network ahead of time, with easy to remember names. Security levels and quality of service levels are assigned to these user groups as well. That is, for each of the selectable IP VPNs, a list of end points, security and QoS policies are associated with the IP VPN. Once the user selects a particular IP VPN, the D-VPN technology configures the network to provide the desired connectivity, security and QoS such that each user in the closed user group is included within the IP VPN.

In another embodiment of the invention (discussed below with respect to FIGS. 14 and 16), the invention is utilized within the context of a Universal Mobile Telecommunications Services (UMTS) packet transport network. In such a packet transport network, a device utilizing the system is assigned a specific Gateway GPRS (Generalized Packet Radio Service) Support Node (GGSN) based upon the most frequent or "home" location of the device. Thus, routing of communications may be inefficient and costly since the home GGSN is always utilized. However, in this embodiment a D-VPN manager (such as a D-VPN manager 70 as discussed above) cooperating with the various systems (such as the home GGSN) determines the location of a device connecting to the UMTS, retrieves routing policies associated with that device, and provides the routing policies to the Serving GPRS Support Node (SGSN). The SGSN then causes the device communications to be routed through the GGSN closest to the device, rather than the home GGSN. That is, the GGSN near the communicating device becomes, in effect, the home GGSN. In this manner, the cost to both the user and service provider of communications in non-home areas is reduced, while the QoS is improved.

Figure 14:
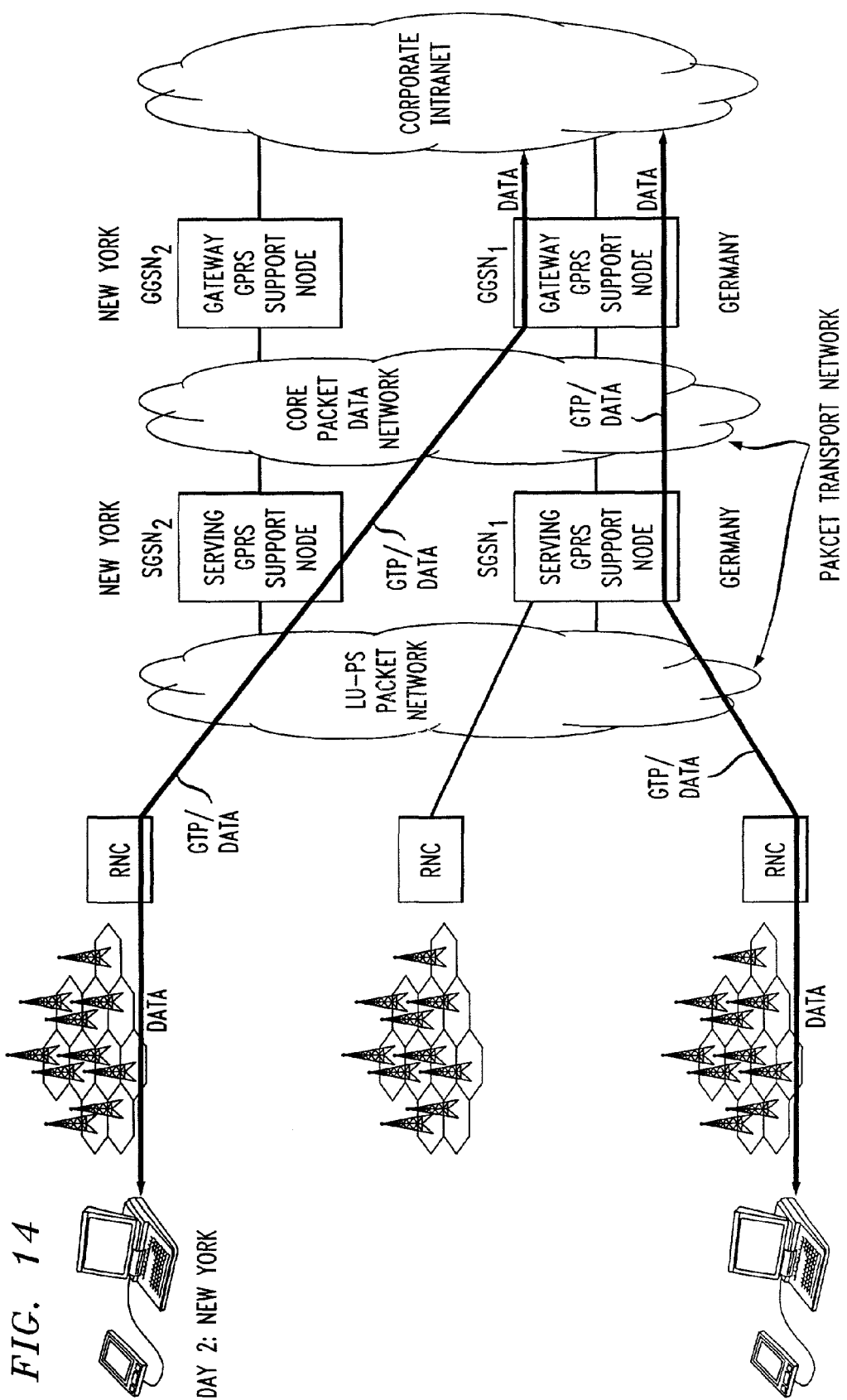
FIG. 14 graphically depicts an illustrative example of packet routing in a UMTS packet transport network.

FIG. 14 graphically depicts an illustrative example of packet routing in a UMTS packet transport network. A UMTS subscriber 1410B is based in Germany. A UMTS packet transport network is statically configured to route subscriber packets to a specific GGSN, usually closest to their home base and therefore probably in Germany (identified as $GGSN_1$ in FIG. 14). When the user is at home (Germany) and connects to the UMTS network, the user is connected to a Serving GPRS Service Node (SGSN) (identified as $SGSN_1$ in FIG. 14 and located in Germany in this example) which downloads routing policies as part of the UMTS authentication procedure that configures $SGSN_1$ to route the UMTS user's packets to the $GGSN_1$ located in Germany. If the user were to travel to New in New York (identified as $SGSN_2$ in FIG. 14). The UMTS authentication procedure then downloads routing policies to configure $SGSN_2$ to route the user's packets back to $GGSN_1$ located in Germany even though the UMTS can access the corporate intranet from New York.

Figure 15:
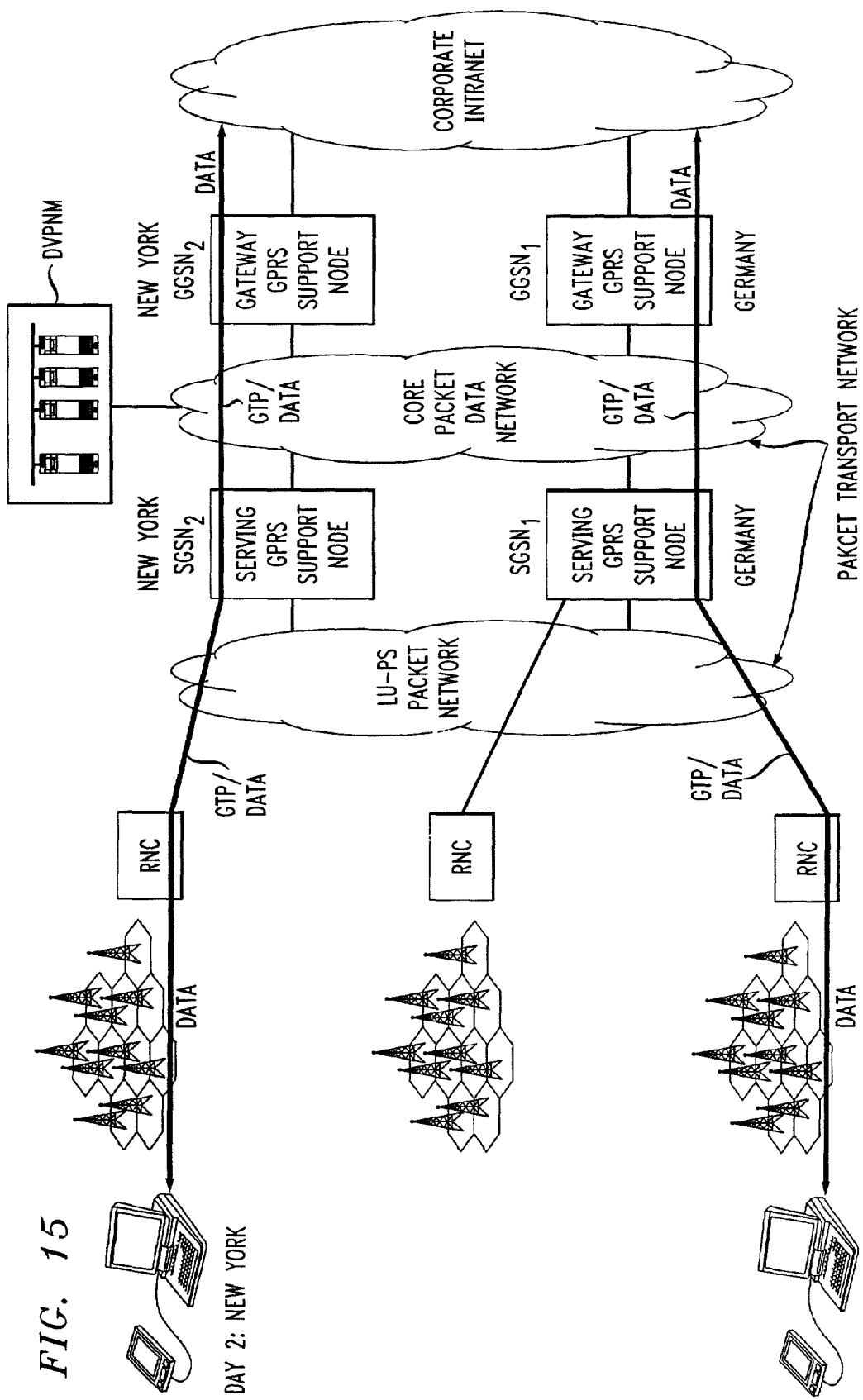
FIG. 15 graphically depicts D-VPN technology utilized to improve the routing efficiency in the UMTS packet transport network of FIG. 14.

FIG. 15 graphically depicts D-VPN technology utilized to improve the routing efficiency in the UMTS packet transport network of FIG. 14. A D-VPN Manager 70 participates in the UMTS authentication procedure by interacting with the UMTS packet transport network elements to determine the user's location. If the user is located in Germany, the user connects to $SGSN_1$ as before, and the D-VPN Manager determines that the user is located in Germany and downloads routing policies to $SGSN_1$ to route the UMTS user's packets to $GGSN_1$ located in Germany as before. If the user travels to New York and accesses the UMTS network, the user still connects to $SGSN_2$ located in New York (as per FIG. 14), but now the D-VPN Manager determines that the user is located in New York and downloads routing policies to $SGSN_2$ that route the UMTS users packets to $GGSN_2$ located in New York thus improving the routing efficiency and packet transport efficiency of the UMTS packet transport network.

Those skilled in the art, and informed by the teachings of this disclosure, will realize that the above-described D-VPN-enabled routing updates to the UMTS packet transport networks can be accomplished in real-time to facilitate a user on the move (e.g., in an automobile or train).

In another embodiment of the invention, the D-VPN technology is incorporated into a Code Division Multiple Access 2000 (CDMA-2000) packet transport network. CDMA-2000 is an alternative 3G wireless technology to UMTS. In such a packet transport network, a device utilizing the system is assigned a specific Home Agent (HA) based upon the most frequent or "home" location of the device. Thus, routing of communications may be inefficient and costly since the same HA is always utilized. However, in this embodiment a D-VPN manager (such as a D-VPN manager usual HA) comprising the CDMA-2000 packet transport network determines the location of a device connecting to the CDMA-2000 network, retrieves routing policies associated with that device, and provides the routing policies to the Foreign Agent (FA). The FA then causes the device communications to be routed through the HA closest to the device, rather than the usual HA. That is, the HA near the communicating device becomes, in effect, the user's HA. In this manner, the cost to both the user and service provider of communications in non-home areas is reduced, while the QoS is improved.

Figure 16:
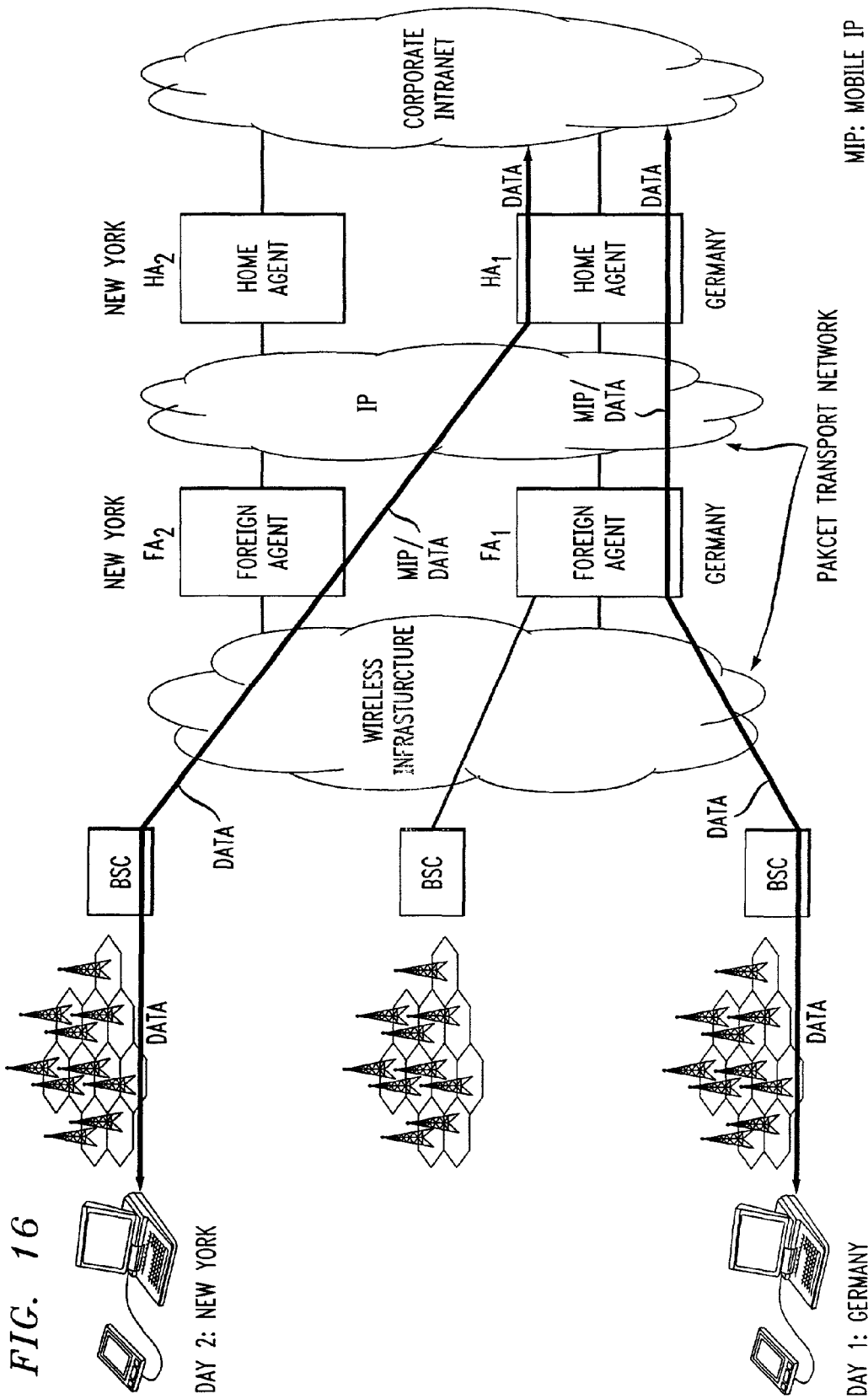
FIG. 16 graphically depicts an example of packet routing in a CDMA-2000 packet transport network.

FIG. 16 graphically depicts an example of packet routing in a CDMA-2000 packet transport network. For example, if a CDMA-2000 subscriber is based in Germany, the CDMA-2000 packet transport network is statically configured to route their packets to a specific Home Agent, usually closest to their home base and therefore probably in Germany (identified as $HA_1$ in FIG. 16). When the user is at home and connects to the CDMA-2000 network, they are connected to a Foreign Agent (identified as $FA_1$ in FIG. 16 and located in Germany in this example) which downloads routing policies as part of the CDMA-2000 authentication procedure that configures $FA_1$ to route the CDMA-2000 user's packets to the $HA_1$ located in Germany. If the user were to travel to New York and access the CDMA-2000 network, he/she would connect to an FA located in New York (identified as $FA_2$ in FIG. 16). The CDMA-2000 authentication procedure would then download routing policies to configure $FA_2$ to still route the user's packets back to $HA_1$ located in Germany even though the CDMA-2000 network can access the corporate intranet from New York.

Figure 17:
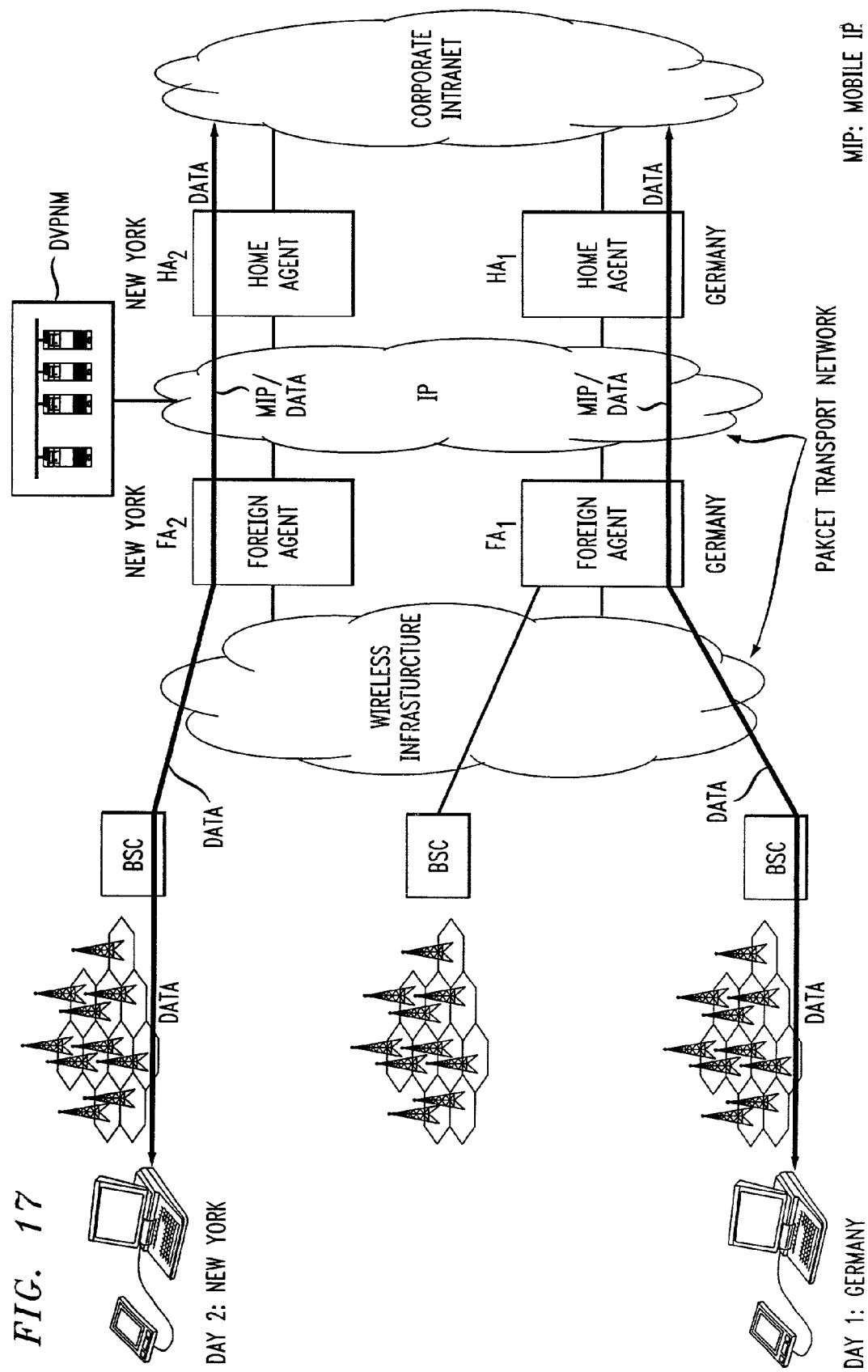
FIG. 17 graphically depicts D-VPN technology utilized to improve the routing efficiency in the CDMA-2000 packet transport network of FIG. 16.

FIG. 17 graphically depicts D-VPN technology utilized to improve the routing efficiency in the CDMA-2000 packet transport network of FIG. 16. The D-VPN Manager participates in the CDMA-2000 authentication procedure by interacting with the CDMA-2000 packet transport network elements to determine the user's location. If the user is located in Germany, he/she connects to $FA_1$ as before, and the D-VPN routing policies to $FA_1$ to route the CDMA-2000 user's packets to $HA_1$ located in Germany as before. If the user travels to New York and accesses the CDMA-2000 network, he/she still connects to $FA_2$ located in New York as before, but now the D-VPN Manager determines that the user is located in New York and downloads routing policies to $FA_2$ that route the CDMA-2000 users packets to $HA_2$ located in New York thus improving the routing efficiency and packet transport efficiency of the CDMA-2000 packet transport network.

Those skilled in the art, and informed by the teachings of this disclosure, will realize that the above-described D-VPN-enabled routing updates to the CDMA-2000 packet transport networks can be accomplished in real-time to facilitate a user on the move (e.g., in an automobile or train).

The above-described D-VPN technology combines IP bandwidth management, IP VPN, and Directory Enabled Networking technologies in a novel and unique way to provide a platform that extends current ISP network capabilities to include: (1) A single user interface for the management of IP VPN services. This user interface may be used by ISP subscribers and ISP network management personnel; (2) On-Demand, automated management of an IP VPN's topology, security, and QoS parameters; (3) On-Demand, automated management of bi-directional IP QoS; (4) The ability to define and store service profiles, application profiles, and security profiles with easy to use names for future retrieval and use; (5) On-Demand, automated retrieval and network deployment of stored service profiles, application profiles, and security profiles in response to D-VPN service requests issued by ISP subscribers or network management personnel; (6) On-Demand, automated modification of network element configurations in response to a security threat; (7) The ability to automatically reject IP VPN and QoS configuration requests and notify the user when sufficient network resources are not available or are inconsistent with the request; (8) Automated renegotiation of access link QoS based on application or user requirements; (9) On-Demand access to satisfy the application's connectivity, security, and QoS requirements; (10) Automated activation and deactivation of the above capabilities based on temporal and repetitive parameters (11) Providing the above capabilities over a wireless access network; (12) The capability to provide and manage Service Level Agreements (e.g. bandwidth usage, latency, security level, and class of service) that can be managed via a Service Level Management module; (13) Automated ASP application registration with ISPs, (14) A set of APIs that allows an application to perform IP VPN management operations without the need for manual intervention, (15) Automated per-use billing capability for IP VPN services on a per-subscriber basis, (16) The ability to define and store IP VPN definitions consisting of topology, security and QoS specifications with easy to use names for future retrieval and use, and (17) Dynamic routing configuration within 3G wireless packet transport networks to optimize packet routing across these networks.

While foregoing is directed to the preferred embodiment of the present invention, other and further embodiments of the invention may be devised without departing from the basic scope thereof, and the scope thereof is determined by the claims that follow.

We claim:

1. Apparatus, comprising:
   a plurality of internet protocol (IP) services aggregation switches for communicating between respective access networks and a core network, each of said IP services aggregation switches communicating with at least one respective VPN customer user, wherein said IP services aggregation switches communicate with said at least one VPN customer user via at least one enhanced integrated access device (EIAD); and
   a dynamic virtual private network (VPN) manager, for providing customer network management and policy server functions, including a user interface enabling remote management of a VPN by a VPN customer user;
   said VPN having at least one of a defined quality of service (QoS) parameter, a defined security parameter and a corresponding billing rate, at least one of said QoS parameter and said security parameter being adapted in response to user commands provided to said dynamic VPN manager by said VPN customer user;
   said dynamic VPN manager adapting at least one of said IP services aggregation switches and at least one of said EIAD to provide a bidirectional QoS for at least one IP flow.

2. The apparatus of claim 1, wherein:
   said dynamic VPN manager adapts at least one of said IP services aggregation switches to provide at least one of a guaranteed QoS parameter and a guaranteed security parameter to said VPN.

3. The apparatus of claim 1, wherein:
   said dynamic VPN manager adapts at least one of said enhanced integrated access devices (EIAD) to provide at least one of a guaranteed QoS parameter and a guaranteed security parameter to said VPN.

4. The apparatus of claim 1, wherein said QoS parameter comprises at least one of a bandwidth parameter, a jitter parameter and a delay parameter.

5. The apparatus of claim 1, wherein said security parameter comprises at least one of an encryption parameter, an authentication parameter and a filtering parameter.

6. The apparatus of claim 1, wherein said VPN supports at least one of an interactive gaming application and a conferencing application.

7. The apparatus of claim 1, wherein:
   said dynamic VPN manager is responsive to a user command to establish an application profile for a VPN, said application profile defining at least one of a QoS parameter, a security parameter and a corresponding billing rate for said VPN during at least one time period;
   said dynamic VPN manager adapting said at least one of a QoS parameter and a security parameter of said VPN according to said application profile.

8. The apparatus of claim 1, wherein a command received from the VPN customer user comprises a user selection of one of a plurality of VPNs to join.

9. The apparatus of claim 1, wherein a command received from the VPN customer user comprises a user selection of one of a plurality of applications based on VPNs to join.

10. The apparatus of claim 8, wherein said plurality of VPNs have at least one of respective QoS requirements and security requirements, said QoS and security requirements having corresponding billing rates.

11. The apparatus of claim 9, wherein said plurality of applications have at least one of respective QoS requirements and security requirements, said QoS and security requirements having corresponding billing rates.

12. The apparatus of claim 1, wherein said dynamic VPN manager comprises:

an enhanced application portal (EAP), for providing said user interface to said VPN customer user and receiving therefrom VPN administration commands adapted to configure said VPN;

a policy server, for communicating configuration parameters to network elements providing said VPN, said network configuration parameters determined according to VPN administration commands and profiles associated with said VPN administration commands; and a directory server, for storing VPN topology and operational parameters and providing said VPN topology and operational parameters to said policy server and said EAP, said VPN topology and operational parameters adapted for being updated by said VPN customer user via said EAP.

13. The apparatus of claim 12, wherein said dynamic VPN manager further comprises:

at least one element management system (EMS) for managing a plurality of network elements forming said VPN.

14. The apparatus of claim 1, wherein said apparatus is included within an Internet service provider (ISP) network including said access networks and said core network, said dynamic VPN manager being included within a data center of said ISP.

15. The apparatus of claim 1, wherein said VPN has associated with it a respective name;

said VPN customer user being able to perform at least one of a VPN create, VPN modify, VPN store and VPN delete, command using said VPN name;

said VPN modify command allows said VPN customer user to modify at least one of said VPN's topology, QoS parameter, and security parameter.

16. The apparatus of claim 15, wherein said VPN is retrieved from storage, activated and deactivated using a corresponding VPN name.

17. A dynamic virtual private network (VPN) manager, comprising:

an enhanced application portal (EAP), for providing a user interface to a VPN customer user, and receiving therefrom VPN administration commands adapted to configure a VPN;

a policy server, for communicating configuration parameters to network elements providing said VPN, said network elements comprising a plurality of internet protocol (IP) services aggregation switches for communicating between respective access networks and a core network and a plurality of enhanced integrated access devices (EIADs) for communicating between VPN customer users and access networks, said network configuration parameters determined according to VPN administration commands and profiles associated with said VPN administration commands; and a directory server, for storing VPN topology and operational parameters and providing said VPN topology and operational parameters to said policy server and said EAP, said VPN topology and operational parameters adapted for being updated by said VPN customer user via said EAP;

said dynamic VPN manager adapting at least one of said IP services aggregation switches and at least one of said EIADs to provide a bidirectional QoS for at least one IP flow.

18. The dynamic VPN manager of claim 17, further comprising:

at least one element management system (EMS) for managing a plurality of network elements forming said VPN.

19. The dynamic VPN manager of claim 17, wherein a managed VPN has associated with it at least one of a defined quality of service (QoS) parameter, a defined security parameter and corresponding billing rate, at least one of said QoS parameter and said security parameter being adapted in response to said VPN administration commands.

20. The dynamic VPN manager of claim 17, wherein:

said dynamic VPN manager is included within a Universal Mobile Telecommunications Services (UMTS) packet transport network, said access networks comprising Gateway Generalized Packet Radio Service support nodes (GGSNs), said user accessing said UMTS packet transport network with a communications device nominally assigned to a home GGSN;

said dynamic VPN manager causing communications with said user communication device to be routed through a GGSN geographically proximate said user communications device.

21. The dynamic VPN manager of claim 20, wherein said determination of geographic location is made during an authentication procedure.

22. The dynamic VPN manager of claim 17, wherein:

said apparatus is included within a CDMA-2000 packet transport network, said access networks comprising home agents, said user accessing said CDMA-2000 packet transport network with a communications device nominally assigned to a home agent;

said dynamic VPN manager causing communications with said user communication device to be routed through a home agent geographically proximate said user communications device.

23. The apparatus of claim 22, wherein said determination of geographic location is made during an authentication procedure.

24. The method of claim 20, wherein said VPN supports at least one application having associated with it at least one of respective QoS requirements and security requirements, said QoS and security requirements having corresponding billing rates.

25. The method of claim 24, wherein said application comprises at least one of an interactive gaming application and a conferencing application.

* * * * *